United States Patent
Li et al.

(10) Patent No.: US 10,334,555 B2
(45) Date of Patent: Jun. 25, 2019

(54) HEIGHT INFORMATION OBTAINING METHOD, USER EQUIPMENT, ACCESS NODE, AND NETWORK SIDE DEVICE

(71) Applicant: Huawei Technologies Co., Ltd., Shenzhen (CN)

(72) Inventors: Yingzhe Li, Shanghai (CN); Tianle Deng, Shanghai (CN); Hongzhuo Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 200 days.

(21) Appl. No.: 15/360,437

(22) Filed: Nov. 23, 2016

(65) Prior Publication Data

US 2017/0078899 A1 Mar. 16, 2017

Related U.S. Application Data

(63) Continuation of application No. PCT/CN2014/078218, filed on May 23, 2014.

(51) Int. Cl.
*H04W 64/00* (2009.01)
*H04W 48/16* (2009.01)

(52) U.S. Cl.
CPC .......... *H04W 64/006* (2013.01); *H04W 48/16* (2013.01)

(58) Field of Classification Search
CPC ............................. H04W 48/16; H04W 64/006
USPC ........................................................ 370/252
See application file for complete search history.

(56) References Cited

U.S. PATENT DOCUMENTS

| | | | |
|---|---|---|---|
| 9,234,965 B2 | 1/2016 | Venkatraman | |
| 2008/0132244 A1 | 6/2008 | Anderson | |
| 2012/0072110 A1 | 3/2012 | Venkatraman | |
| 2012/0075138 A1* | 3/2012 | Stayton | G01S 5/10 342/120 |
| 2013/0219437 A1 | 8/2013 | Ban et al. | |
| 2013/0325385 A1 | 12/2013 | Shin et al. | |
| 2014/0079200 A1 | 3/2014 | Kusakari | |

FOREIGN PATENT DOCUMENTS

| | | |
|---|---|---|
| CN | 103189717 A | 7/2013 |
| CN | 103259777 A | 8/2013 |
| CN | 103686058 A | 3/2014 |
| EP | 2629261 A1 | 8/2013 |

\* cited by examiner

*Primary Examiner* — Natasha W Cosme
(74) *Attorney, Agent, or Firm* — Slater Matsil, LLP

(57) ABSTRACT

A method for providing information about a height of a user equipment is disclosed. In an embodiment the method includes receiving, by user equipment, a first height requirement message sent by a network side device, wherein the first height requirement message is used to obtain a height information of a position in which the user equipment is located, listening, by the user equipment, to a broadcast message of an access node, wherein the broadcast message includes a node identifier of the access node and a receive power information of the access node received by the user equipment, and sending, by the user equipment, a response message to the network side device, wherein the response message includes the node identifier of the access node of the user equipment and the receive power information of the user equipment.

25 Claims, 13 Drawing Sheets

HEIGHT INFORMATION OBTAINING METHOD, USER EQUIPMENT, ACCESS NODE, AND NETWORK SIDE DEVICE

CROSS-REFERENCE TO RELATED APPLICATIONS

This application is a continuation of International Application No. PCT/CN2014/078,218, filed on May 23, 2014, the disclosure of which is hereby incorporated by reference in its entirety.

TECHNICAL FIELD

The present invention relates to the mobile communications field, and specifically, to a height information obtaining method, user equipment, an access node, and a base station.

BACKGROUND

To reduce a propagation loss of a radio signal in space, a future wireless network will be a drip irrigation network and a green network with precise signal energy delivery, that is, during radio signal deployment, targeted refined coverage of radio signals is implemented.

To implement the refined coverage of radio signals, a position in which user equipment (UE) is located has to be known. In the prior art, two-dimensional plane positioning may be performed on UE by using a technology of wireless network feature network matching positioning, a satellite positioning technology, or a Wireless Fidelity (WiFi) technology. Positioning precision of the technology of wireless network feature network matching positioning is at least 50 meters, and therefore this technology cannot be expanded and used for height positioning due to excessively low positioning precision. The satellite positioning technology can be used only outdoors, and horizontal precision thereof is 10 meters. Therefore, an application scope of this technology is limited. A disadvantage of a WiFi feature indoor positioning technology lies in that a feature measurement needs to be performed in advance on a positioning area. Therefore, wide promotion and implementation are difficult. None of the foregoing technologies well resolve a problem of determining height information of the UE.

SUMMARY

Embodiments of the invention provide a height information obtaining method so that a network side can obtain height information of UEs.

In a first aspect, embodiments of the present invention provide a height information obtaining method, wherein the method includes receiving, by user equipment, a height requirement message sent by a network side device, where the height requirement message is used to obtain height information of a position in which the user equipment is located, listening to, by the user equipment, a broadcast message of an access node, where the broadcast message includes a node identifier of the access node and receive power information for receiving the access node signal by the user equipment and sending, by the user equipment, a response message to the network side device, where the response message includes a node identifier of an access node of the user equipment and the receive power information of the user equipment, so that the network side determines, according to the response message, the height information of the position in which the user equipment is located.

With reference to the first aspect, in a first possible implementation manner, the broadcast message further includes height information of a position in which the access node is located and the response message sent by the user equipment to the network side further includes the height information of the position in which the user equipment is located, where the height information of the position of the user equipment is the height information of the position in which the access node is located.

With reference to the first aspect, in a second possible implementation manner, the broadcast message further includes height information of a position in which the access node is located and when the user equipment receives broadcast messages of different access nodes, the user equipment selects, according to values of receive powers for receiving different access node signals by the user equipment, height information sent by an access node with a maximum receive power as the height information of the position in which the user equipment is located.

With reference to the first aspect, in a third possible implementation manner, the method further includes obtaining, by the user equipment by means of measurement, the height information of the position in which the user equipment is located and the response message sent by the user equipment to the network side further includes the height information of the position in which the user equipment is located.

According to a second aspect, an embodiment of the present invention provides a height information obtaining method, where the method includes sending, by a network side device, a height requirement message to user equipment, where the height requirement message is used to obtain height information of a position in which the user equipment is located, receiving a response message sent by the user equipment, where the response message includes a node identifier of an access node of the user equipment and receive power information for receiving an access node signal by the user equipment and determining, according to the response message, the height information of the position in which the user equipment is located.

With reference to the second aspect, in a first possible implementation manner, the broadcast message further includes height information of the access node, and the response message further includes the height information of the position in which the user equipment is located, where the height information of the position in which the user equipment is located is determined by the user equipment according to the height information of the access node.

With reference to the second aspect, in a second possible implementation manner, the broadcast message further includes height information of the access node, and the response message further includes the height information of the position in which the user equipment is located, where the height information of the position in which the user equipment is located is height information of an access node that is selected by the user equipment according to values of receive powers of the different access nodes and that has a maximum receive power.

With reference to the second aspect, in a third possible implementation manner, the response message further includes the height information of the position in which the user equipment is located, where the height information is obtained by the user equipment by means of measurement.

With reference to the first or the second possible implementation manner of the second aspect, in a fourth possible implementation manner, the method further includes storing, by the network side device, height information of a position in which each user equipment is located, the node identifier of the access node of the user equipment, and the receive power information for receiving the access node signal by the user equipment.

With reference to the second aspect, in a fifth possible implementation manner, the determining, according to the response message of the user equipment, the height information of the position in which the user equipment is located specifically includes searching, according to the node identifier of the access node of the user equipment and the receive power information for receiving the access node signal by the user equipment, for height information of user equipment corresponding to the node identifier and the receive power information.

According to a third aspect, an embodiment of the present invention provides a height information obtaining method, where the method includes listening to, by user equipment, a broadcast message of an access node, where the broadcast message includes a node identifier of the access node and receive power information of the user equipment for the access node and determining, by the user equipment according to the broadcast message, height information of a position in which the user equipment is located.

With reference to the third aspect, in a first possible implementation manner, the broadcast message further includes height information of a position in which the access node is located and the determining, by the user equipment according to the broadcast information, height information of a position in which the user equipment is located includes determining, by the user equipment, that the height information of the position in which the access node is located is the height information of the position in which the user equipment is located.

With reference to the third aspect, in a second possible implementation manner, the broadcast message further includes height information of a position in which the access node is located, and when obtaining, by means of listening, broadcast messages of multiple different access nodes, the user equipment selects, according to values of receive powers for receiving different access node signals by the user equipment, height information sent by an access node with a maximum receive power as the height information of the position in which the user equipment is located.

With reference to the third aspect, in a third possible implementation manner, the determining, according to the broadcast message, height information of a position in which the user equipment is located specifically includes sending height requirement information to a base station, where the height requirement information includes the node identifier of the access node and the receive power information of the user equipment for the access node and receiving a response message returned by the base station, where the response message includes the height information of the position in which the user equipment is located.

According to a fourth aspect, an embodiment of the present invention provides a height information obtaining method, where the method includes receiving, by an access node, a first height information requirement message delivered by a network side, where the first height information requirement message is used to obtain height information of a position in which the access node is located, obtaining, by the access node, the height information of the position in which the access node is located and sending, by the access node, a response message to the network side, where the response message includes the height information of the position in which the access node is located.

With reference to the fourth aspect, in a first possible implementation manner, the height information, obtained by the access node, of the position in which the access node is located includes height information, obtained by the access node by means of measurement, of the position in which the access node is located.

With reference to the fourth aspect, in a second possible implementation manner, the obtaining, by the access node, the height information of the position in which the access node is located specifically includes sending, by the access node, a second height information requirement message to user equipment, where the user equipment is located in a signal coverage area of the user node, and the second height information requirement message is used to obtain height information of a position in which the user equipment is located, receiving a response message reported by the user equipment, where the response message includes the height information of the position in which the user equipment is located, and using the height information of the position in which the user equipment is located as the height information of the position in which the access node is located.

According to a fifth aspect, an embodiment of the present invention provides user equipment, where the user equipment includes a receiving unit, configured to receive a height requirement message sent by a network side device, where the height requirement message is used to obtain height information of a position in which the user equipment is located, a listening unit, configured to listen to a broadcast message sent by an access node, where the broadcast message includes a node identifier of the access node and receive power information for receiving the access node signal by the user equipment and a sending unit, configured to send a response message to the network side device, where the response message includes a node identifier of an access node of the user equipment and the receive power information of the user equipment, so that the network side determines, according to the response message, the height information of the position in which the user equipment is located.

With reference to the fifth aspect, in a first possible implementation manner, the broadcast message includes height information of a position in which the access node is located, and the user equipment further includes a processing unit, configured to use the height information of the position in which the access node is located as the height information of the position in which the user equipment is located and the response message sent by the sending unit to the network side further includes the height information of the position in which the user equipment is located.

With reference to the fifth aspect, in a second possible implementation manner, the broadcast message further includes height information of a position in which the access node is located, and the user equipment further includes a selection unit, configured to: when the user equipment receives broadcast messages of different access nodes, select, according to values of receive powers for receiving different access node signals by the user equipment, height information sent by an access node with a maximum receive power as the height information of the position in which the user equipment is located.

With reference to the fifth aspect, in a third possible implementation manner, the user equipment has a height measurement module, configured to measure the height information of the position in which the user equipment is located, and the response message sent by the sending unit to the network side further includes the height information of the position in which the user equipment is located.

According to a sixth aspect, an embodiment of the present invention provides a network side device, where the network side device includes a sending unit, configured to send a first height requirement message to user equipment, where the first height requirement message is used to obtain height information of a position in which the user equipment is located, a receiving unit, configured to receive a response message sent by the user equipment, where the response message includes a node identifier of an access node of the user equipment and receive power information for receiving the access node signal by the user equipment and a processing unit, configured to determine, according to the response message of the user equipment, the height information of the position in which the user equipment is located.

With reference to the sixth aspect, in a first possible implementation manner, the broadcast message further includes height information of the access node, and the response message further includes the height information of the position in which the user equipment is located, where the height information of the position in which the user equipment is located is height information of an access node that is selected by the user equipment according to values of receive powers of the different access nodes and that has a maximum receive power.

With reference to the sixth aspect, in a second possible implementation manner, the response message further includes the height information of the position in which the user equipment is located, where the height information is obtained by the user equipment by means of measurement.

With reference to the first or the second implementation manner of the sixth aspect, in a third possible implementation manner, the device further includes a storage unit, configured to store height information of a position in which each user equipment is located, the node identifier of the access node of the user equipment, and the receive power information for receiving the access node signal by the user equipment, so as to establish a query database.

With reference to the sixth aspect, in a fourth possible implementation manner, the processing unit is specifically configured to search, according to the node identifier of the access node of the user equipment and the receive power information for receiving the access node signal by the user equipment, the query database for height information of user equipment corresponding to the node identifier and the receive power information.

According to a seventh aspect, an embodiment of the present invention provides user equipment, where the user equipment includes a listening unit, configured to listen to a broadcast message of an access node, where the broadcast message includes a node identifier of the access node and receive power information of the user equipment for the access node and a processing unit, configured to determine, according to the broadcast message, height information of a position in which the user equipment is located.

With reference to the seventh aspect, in a first possible implementation manner, the broadcast message further includes height information of a position in which the access node is located and the processing unit uses the height information of the position in which the access node is located as the height information of the position in which the user equipment is located.

With reference to the seventh aspect, in a second possible implementation manner, the broadcast message further includes height information of a position in which the access node is located and the user equipment further includes a selection unit, configured to: when the user equipment obtains, by means of listening, broadcast messages of multiple different access nodes, select, according to values of receive powers for receiving different access node signals by the user equipment, height information sent by an access node with a maximum receive power as the height information of the position in which the user equipment is located.

With reference to the seventh aspect, in a third possible implementation manner, the user equipment further includes: a sending unit, configured to send height requirement information to a base station, where the height requirement information includes the node identifier of the access node and the receive power information of the user equipment for the access node and a receiving unit, configured to receive a response message returned by the base station, where the response message includes the height information of the position in which the user equipment is located.

According to an eighth aspect, an embodiment of the present invention provides an access node, where the access node includes a receiving unit, configured to receive a first height information requirement message delivered by a network side, where the first height information requirement message is used to obtain height information of a position in which the access node is located, an obtaining unit, configured to obtain the height information of the position in which the access node is located and a sending unit, configured to send a response message to the network side, where the response message includes the height information of the position in which the access node is located.

With reference to the eighth aspect, in a first possible implementation manner, the access node has a height measurement module, configured to measure the height information of the position in which the access node is located.

With reference to the eighth aspect, in a second possible implementation manner, the obtaining unit further includes a requirement sending unit, configured to send, by the access node, a second height information requirement message to user equipment, where the user equipment is located in a signal coverage area of the user node, and the second height information requirement message is used to obtain height information of a position in which the user equipment is located, a response receiving unit, configured to receive a response message reported by the user equipment, where the response message includes the height information of the position in which the user equipment is located and a processing unit, configured to use the height information of the position in which the user equipment is located as the height information of the position in which the access node is located.

According to a ninth aspect, an embodiment of the present invention provides user equipment, where the user equipment includes a transmitter, a receiver, a memory, and a processor separately connected to the transmitter, the receiver, and the memory, where the memory stores a group of program code, and the processor is configured to invoke the program code stored in the memory, so as to execute the following operations receiving, by using the receiver, a height requirement message sent by a network side device, where the height requirement message is used to obtain height information of a position in which the user equipment is located, listening to, by using the receiver, a broadcast message of an access node, where the broadcast message includes a node identifier of the access node and receive power information for receiving the access node signal by the user equipment and sending, by using the transmitter, a response message to the network side device, where the response message includes a node identifier of an access node of the user equipment and the receive power information of the user equipment, so that the network side determines, according to the response message, the height information of the position in which the user equipment is located.

With reference to the ninth aspect, in a first possible implementation manner, the broadcast message further includes height information of a position in which the access node is located and the response message sent by the transmitter to the network side further includes the height information of the position in which the user equipment is located, where the height information of the position of the user equipment is the height information of the position in which the access node is located.

With reference to the ninth aspect, in a second possible implementation manner, the broadcast message further includes height information of a position in which the access node is located and when the receiver receives broadcast messages of different access nodes, the processor selects, according to values of receive powers for receiving different access node signals by the processor, height information sent by an access node with a maximum receive power as the height information of the position in which the user equipment is located.

With reference to the ninth aspect, in a third possible implementation manner, the response message sent by the transmitter to the network side further includes the height information of the position in which the user equipment is located.

According to a tenth aspect, an embodiment of the present invention provides a network side device, where the network side device includes a transmitter, a receiver, a memory, and a processor separately connected to the transmitter, the receiver, and the memory, where the memory stores a group of program code, and the processor is configured to invoke the program code stored in the memory, so as to execute the following operations sending, by using the transmitter, a height requirement message to user equipment, where the height requirement message is used to obtain height information of a position in which the user equipment is located, receiving, by using the receiver, a response message sent by the user equipment, where the response message includes a node identifier of an access node of the user equipment and receive power information for receiving the access node signal by the user equipment, an determining, by the processor according to the response message of the user equipment, the height information of the position in which the user equipment is located.

With reference to the tenth aspect, in a first possible implementation manner, the broadcast message further includes height information of the access node, and the response message further includes the height information of the position in which the user equipment is located, where the height information of the position in which the user equipment is located is determined by the user equipment according to the height information of the access node.

With reference to the tenth aspect, in a second possible implementation manner, the broadcast message further includes height information of the access node, and the response message further includes the height information of the position in which the user equipment is located, where the height information of the position in which the user equipment is located is height information of an access node that is selected by the user equipment according to values of receive powers of the different access nodes and that has a maximum receive power.

With reference to the tenth aspect, in a third possible implementation manner, the response message further includes the height information of the position in which the user equipment is located, where the height information is obtained by the user equipment by means of measurement.

With reference to the tenth aspect, in a fourth possible implementation manner, the memory stores height information of a position in which each user equipment is located, the node identifier of the access node of the user equipment, and the receive power information for receiving the access node signal by the user equipment.

With reference to the tenth aspect, in a fourth possible implementation manner, the processor searches, according to the node identifier of the access node of the user equipment and the receive power information for receiving the access node signal by the user equipment, for height information of user equipment corresponding to the node identifier and the receive power information.

According to an eleventh aspect, an embodiment of the present invention provides user equipment, where the user equipment includes a transmitter, a receiver, a memory, and a processor separately connected to the transmitter, the receiver, and the memory, where the memory stores a group of program code, and the processor is configured to invoke the program code stored in the memory, so as to execute the following operations listening to, by using the receiver, a broadcast message of an access node, where the broadcast message includes a node identifier of the access node and receive power information of the user equipment for the access node and determining, by the processor according to the broadcast message, height information of a position in which the user equipment is located.

With reference to the eleventh aspect, in a first possible implementation manner, the broadcast message further includes height information of a position in which the access node is located and the processor determines that the height information of the position in which the access node is located is the height information of the position in which the user equipment is located.

With reference to the eleventh aspect, in a second possible implementation manner, the broadcast message further includes height information of a position in which the access node is located, and when obtaining, by means of listening, broadcast messages of multiple different access nodes, the user equipment selects, according to values of receive powers for receiving different access node signals by the user equipment, height information sent by an access node with a maximum receive power as the height information of the position in which the user equipment is located.

With reference to the eleventh aspect, in a third possible implementation manner, the transmitter sends height requirement information to a network side device, where the height requirement information includes the node identifier of the access node and the receive power information of the user equipment for the access node; and the receiver receives a response message returned by the base station, where the response message includes the height information of the position in which the user equipment is located.

According to a twelfth aspect, an embodiment of the present invention provides an access node, where the access node includes a transmitter, a receiver, a memory, and a processor separately connected to the transmitter, the receiver, and the memory, where the memory stores a group of program code, and the processor is configured to invoke the program code stored in the memory, so as to execute the following operations receiving, by using the receiver, a first height information requirement message delivered by a network side, where the first height information requirement message is used to obtain height information of a position in which the access node is located, obtaining, by the processor, the height information of the position in which the access node is located, and sending, by using the transmitter, a response message to the network side, where the response message includes the height information of the position in which the access node is located.

With reference to the twelfth aspect, in a first possible implementation manner, the access node has a height measurement module, and the processor obtains, according to a result from the height measurement module, the height information of the position in which the access node is located.

According to the embodiments of the present invention, a network side can obtain height information of user equipment or an access node in time, so that an operator collects statistics according to the height information of the node or the UE, so as to perform defined coverage of a wireless network.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
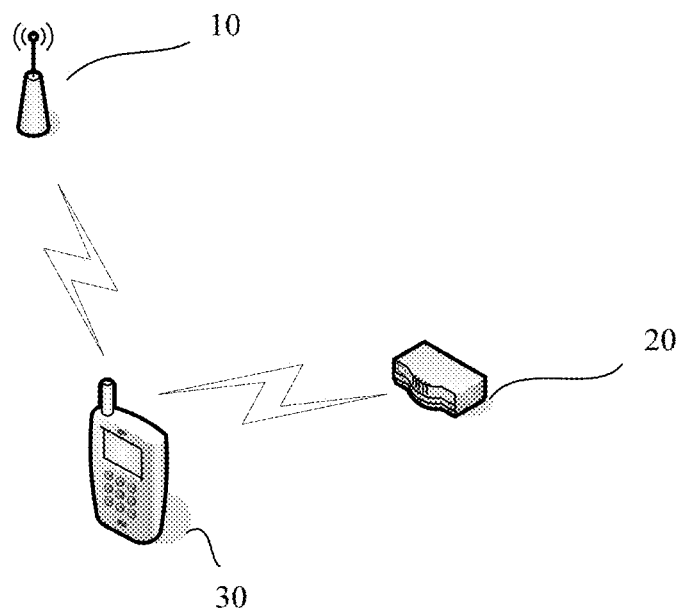
FIG. 1 is an application architecture diagram of a height information obtaining method according to the present invention.

FIG. 1 is a basic network architecture diagram. This network architecture includes a network side device, and user equipment that has accessed a node, where the network side device includes but is not limited to a NodeB, a base station, an evolved NodeB, and small and micro base stations. The user equipment includes but is not limited to a smartphone and a tablet computer. The access node is generally a low-power wireless access node, for example, a wireless router, a wireless modem, or the like. In a general case, the network side device may communicate with the user equipment, and the user equipment may connect to one access node. FIG. 1 shows only one access node; however, one user equipment may be simultaneously located in signal coverage areas of several access nodes.

The user equipment may have a height measurement module, for example, a device that can obtain a height of a position in which the user equipment is located, such as an altitude instrument, a height gauge, or a barometer.

Similarly, the access node may also have a height measurement module, for example, a device that can obtain a height of a position in which the access node is located, such as an altitude instrument, a height gauge, or a barometer.

The network side device may collect statistics about a distribution situation of the user equipment by collecting height information of the user equipment, so that an operator or another architecture unit increases or reduces signal coverage strength of a specific area according to density of a three-dimensional position of the user equipment, to implement refined coverage.

In some application environments, if the user equipment does not have a height measurement capability, the user equipment may also obtain the height information of the user equipment by interacting with the access node or the network side device.

On the basis of the foregoing architecture, a height information obtaining method provided in this embodiment of the present invention may be used by a network side to obtain height information of user equipment, may be used by the user equipment to obtain the height information of the user equipment, or may be used by the network side or an access node to obtain the height information of the user equipment or height information of the access node.

Figure 2:
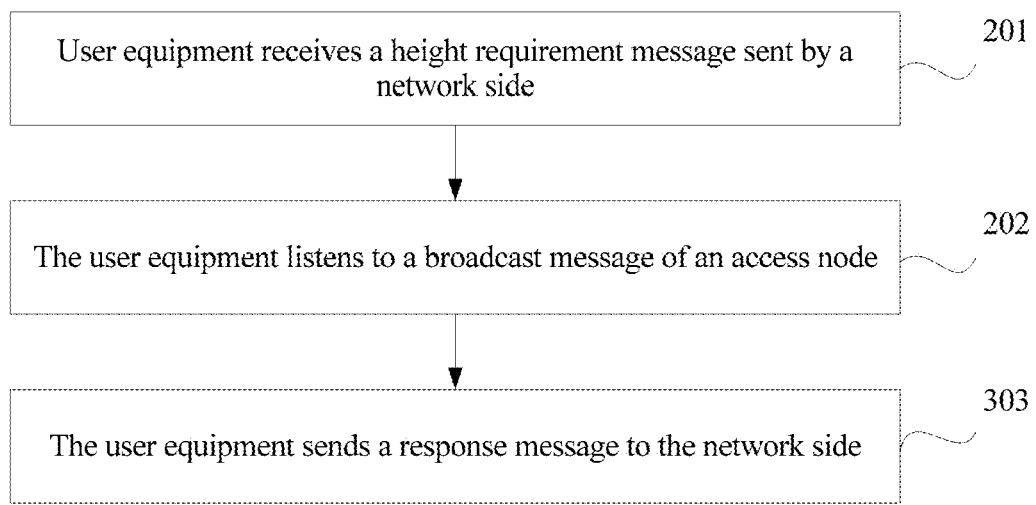
FIG. 2 is a flowchart of an embodiment of a height information obtaining method according to the present invention.

As shown in FIG. 2, an embodiment of the present invention provides a height information obtaining method.

This embodiment is executed by user equipment, and in this embodiment, the method may include:

201. The user equipment receives a height requirement message sent by a network side device, where the height requirement message is used to obtain height information of a position in which the user equipment is located.

102. The user equipment listens to a broadcast message of an access node, where the broadcast message includes a node identifier of the access node and receive power information for receiving the access node signal by the user equipment.

103. The user equipment sends a response message to the network side, where the response message includes a node identifier of an access node of the user equipment and the receive power information of the user equipment, so that the network side determines, according to the response message, the height information of the position in which the user equipment is located.

In an embodiment, a height measurement module is integrated in the access node. However, the user equipment does not have a capability of measuring a height of the position in which the user equipment is located. The height measurement module may be a device that can obtain a height of a position in which the access node is currently located, such as an altitude instrument, a height gauge, or a barometer.

Figure 3:
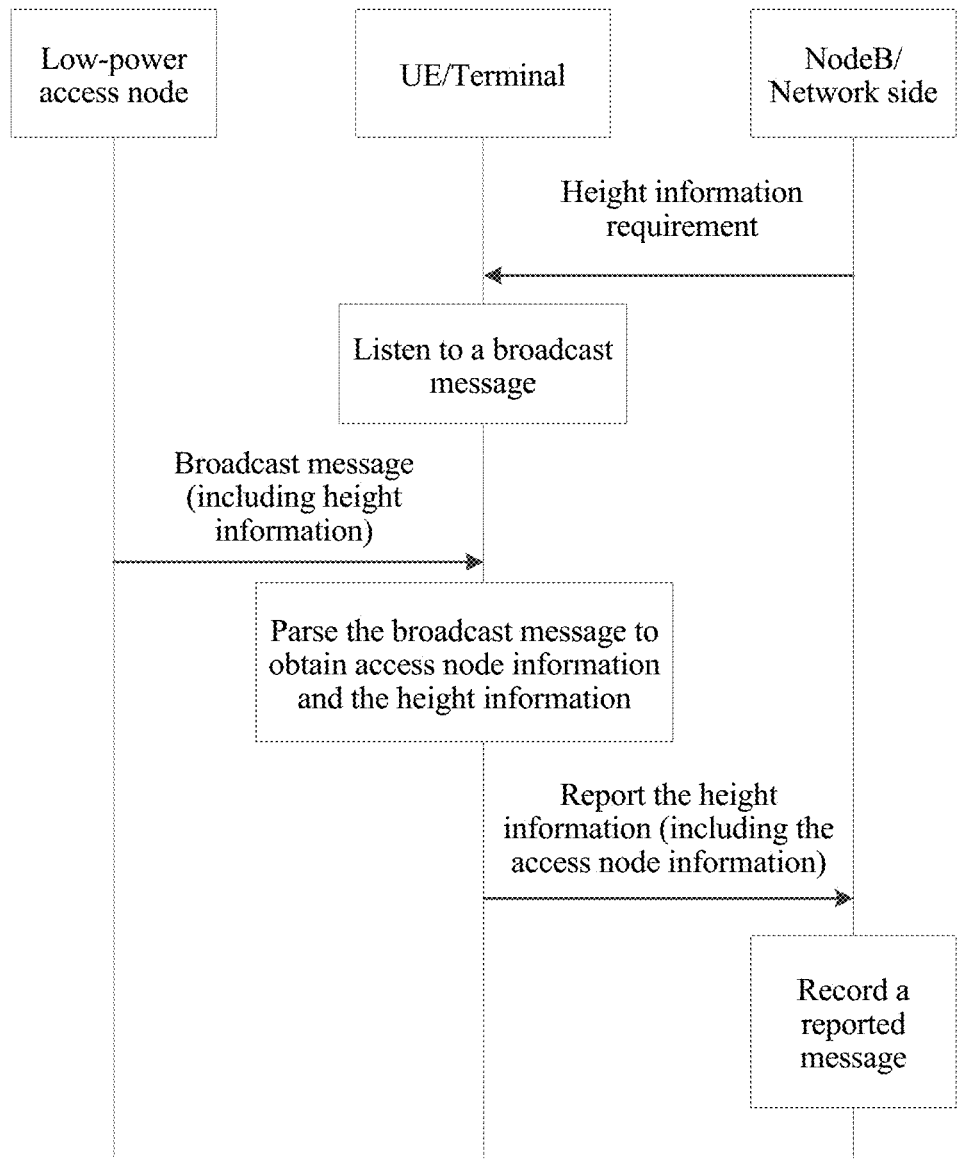
FIG. 3 is an interaction state diagram of an embodiment of a height information obtaining method according to the present invention.

For a terminal device interaction state in this embodiment, reference may be made to FIG. 3. In this embodiment, a low-power access node may periodically add, into the broadcast message, height information of a position in which the low-power access node is currently located. The user equipment connects to or approaches the access node; therefore, the user equipment may consider height data in position information of the access node as the height information of the user equipment.

If the user equipment may simultaneously obtain, by means of listening, broadcast messages of different access nodes, the user equipment may select height information of an access node with a maximum receive power as the height information of the user equipment.

The network side sends a height information requirement to the UE by using a node NodeB, and the UE determines, according to information carried in the broadcast message that is obtained, by means of listening, by the UE, the height information of the position in which the user equipment is located.

For example, as listed in Table 1, the UE may obtain, by means of listening, broadcast messages broadcast by multiple surrounding access nodes, and the broadcast message includes a node identifier of each access node and a corresponding receive power. In this embodiment, the UE selects the height information of the access node with the maximum receive power as the height information of the position in which the UE is located, for example, height information broadcast by AP_1 is 10 m.

TABLE 1

| Low-Power Access Node Identifier | Receive Power (dBm) | Height (m) |
| --- | --- | --- |
| AP_1 | −78 | 18 |
| AP_2 | −65 | 15 |
| AP_3 | −90 | 9 |

Then, the UE sends a response message to the NodeB to inform the network side of the height information of the UE, a node identifier of the access node accessed by the UE, and a receive power of a broadcast message of the access node, that is, to report to the network side that when corresponding to the access node AP-1 and a receive power −78 dBm, the height of the position in which the UE is located is 18 m.

After receiving the response message, the network side records the foregoing information, and integrates information reported by different user equipments at different moments, so as to establish a database. When user equipment required to obtain a height and an access node accessed by the user equipment do not have a height measurement capability, the height information of the user equipment can be determined by searching the database and according to an access node identifier and receive power information stored in the database.

For the database established by the network side, reference may be made to Table 2.

TABLE 2

| Measurement Time | UE Identifier | Height of UE (m) | Access Node Identifier | Receive Power (dBm) | Height (m) |
| --- | --- | --- | --- | --- | --- |
| Dec. 2, 2012 12:02:20 | UE_1 | 15 | AP_1 | −78 | 18 |
|  |  |  | AP_2 | −65 | 15 |
|  |  |  | AP_3 | −90 | 9 |
| Dec. 2, 2012 12:20:02 | UE_2 | 9 | AP_3 | −63 | 9 |
|  |  |  | AP_4 | −80 | 6 |

In another embodiment, the user equipment has a height measurement module, that is, the user equipment has a height measurement capability. Similar to the foregoing embodiment, the height measurement module may be a device that can obtain a height of a position in which the access node is currently located, such as an altitude instrument, a height gauge, or a barometer. The user equipment may obtain, according to a measurement result from the height measurement module, the height information of the position in which the user equipment is located.

Figure 5:
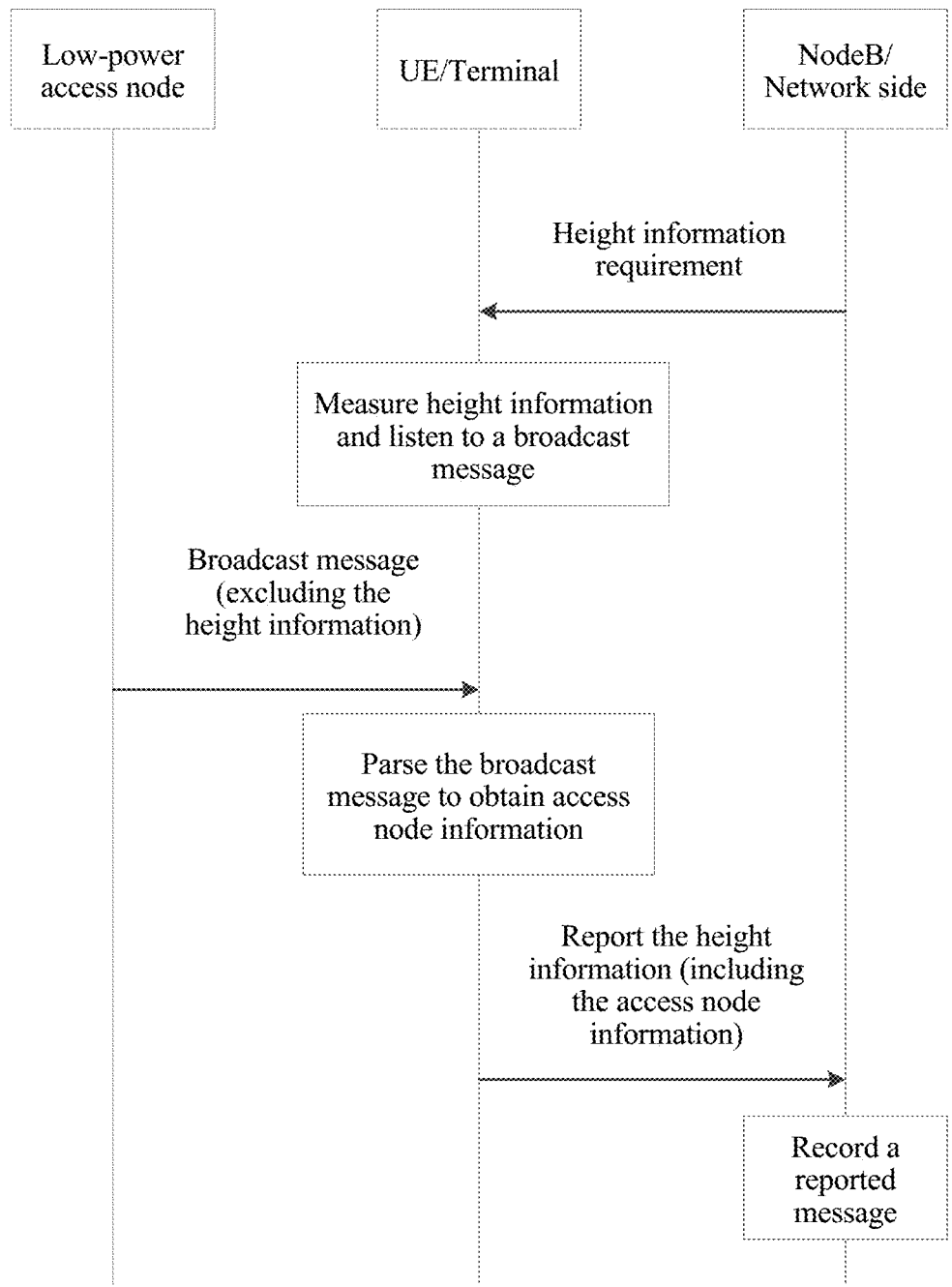
FIG. 5 is an interaction state diagram of an embodiment of a height information obtaining method according to the present invention.

For an interaction state of this embodiment, reference may be made to FIG. 5. Similar to the embodiment shown in FIG. 3, the UE may choose to periodically listen to broadcast messages of surrounding access nodes, or only after receiving the height requirement message sent by the user equipment, enable listening to the broadcast messages of the surrounding access nodes, where the broadcast messages carry a node identifier of an access node. The UE may determine a receive power of the UE according to signal strength of a received broadcast message. The UE may also choose to listen to the broadcast messages of the surrounding access nodes after receiving a first height requirement message sent by a network side NodeB.

Similar to the embodiment shown in FIG. 3, the UE may obtain, by means of listening, broadcast messages broadcast by multiple surrounding access nodes, and the broadcast message includes a node identifier of each access node and a corresponding receive power. As listed in Table 3, the broadcast message received by the UE does not include the height information. In this embodiment, the UE has the height measurement capability; therefore, the UE selects node information of an access node with a maximum receive power, and reports the node information together with the height information of the UE to the network side.

TABLE 3

| Low-Power Access Node Identifier | Receive Power (dBm) | Height (m) |
|---|---|---|
| AP_1 | −78 | — |
| AP_2 | −65 | — |
| AP_3 | −90 | — |

Similar to the embodiment shown in FIG. 3, in this case, after receiving the response message, the network side device, for example, a base station, records the foregoing information, and integrates information reported by different user equipments at different moments, so as to establish a query database. When user equipment required to obtain a height and an access node accessed by the user equipment do not have a height measurement capability, the height information of the user equipment can be determined by searching the database and according to an access node identifier and receive power information stored in the database. For the database established in this embodiment, reference may be made to Table 4.

TABLE 4

| Measurement Time | UE Identifier | Height of UE (m) | Low-Power Access Node Identifier | Receive Power (dBm) | Height (m) |
|---|---|---|---|---|---|
| Dec. 2, 2012 12:02:20 | UE_1 | 15 | AP_1 | −78 | |
| | | | AP_2 | −65 | |
| | | | AP_3 | −90 | |
| Dec. 2, 2012 12:20:02 | UE_2 | 9 | AP_3 | −63 | |
| | | | AP_4 | −80 | |

The response message sent by the user equipment to the network side further includes the height information of the position in which the user equipment is located.

Figure 4:
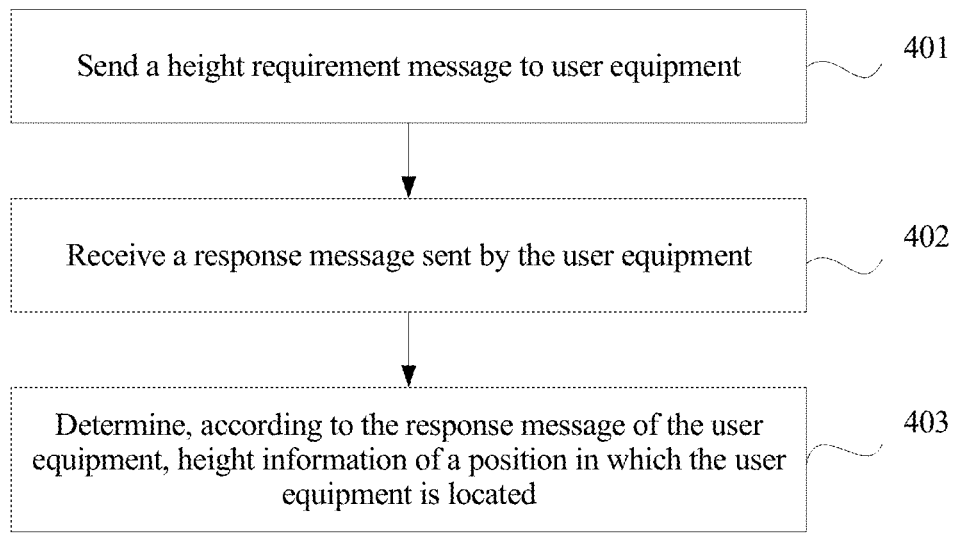
FIG. 4 is a flowchart of an embodiment of a height information obtaining method according to the present invention.

For a network side, a method provided in an embodiment of the present invention may be shown as FIG. 4, including:

401. The network side device sends a height requirement message to user equipment.

402. Receive a response message sent by the user equipment, where the response message includes a node identifier of an access node of the user equipment and receive power information of the user equipment.

403. Determine, according to the response message of the user equipment, height information of a position in which the user equipment is located.

When the access node has a height measurement capability, the broadcast message further includes height information of the access node. The response message further includes the height information of the position in which the user equipment is located, where the height information of the position in which the user equipment is located is determined by the user equipment according to the height information of the access node. Alternatively, the height information of the position in which the user equipment is located is height information of an access node that is selected by the user equipment according to values of receive powers of the different access nodes and that has a maximum receive power.

When the user equipment has a height measurement capability, the response message sent by the user equipment to the network side further includes the height information of the position in which the user equipment is located, where the height information is obtained by the user equipment by means of measurement.

After obtaining height information of user equipment and obtaining a node identifier and receive power information of an access node from response information sent by the user equipment, the network side device stores height information of a position in which each user equipment is located, the node identifier of the access node of the user equipment, and receive power information for receiving the access node signal by the user equipment, so as to establish a query database.

When the user equipment does not have a height measurement capability, and there is no access node having a height measurement capability around the user equipment, the network side device may search, according to the node identifier of the access node and the receive power information of the user equipment that are in the response message sent by the user equipment, the query database for height information of user equipment corresponding to the node identifier and the receive power information.

However, it should be noted that, when the user equipment has a height measurement capability, the height information of the user equipment may be obtained in a manner shown in FIG. 5, and the node identifier of the access node and the receive power information do not necessarily need to be obtained.

When the user equipment does not have a height measurement capability, but a low-power access node has a height measurement capability, the height information of the UE may be obtained in a manner shown in FIG. 3.

Figure 6:
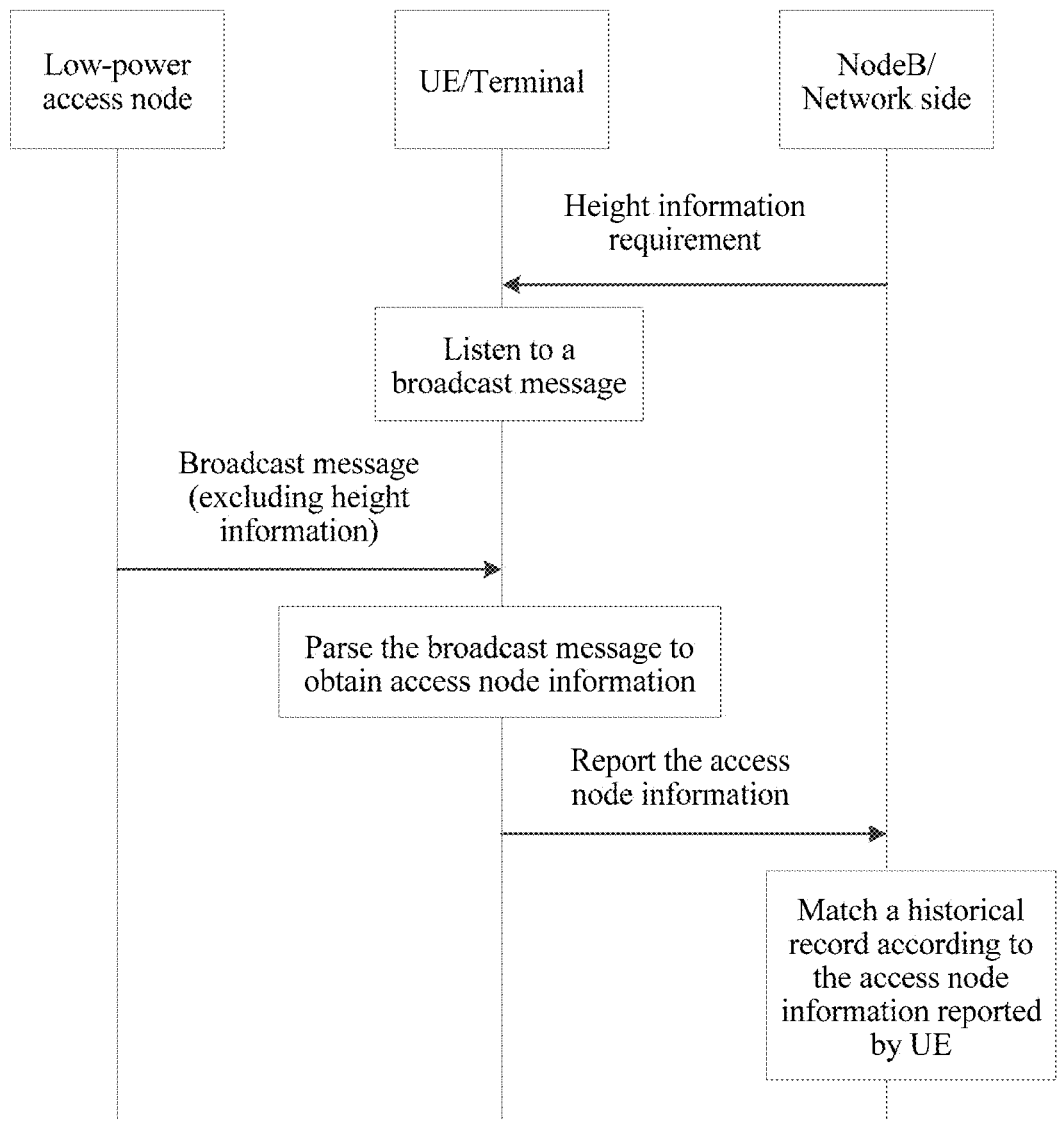
FIG. 6 is an interaction state diagram of an embodiment of a height information obtaining method according to the present invention.

However, when neither the UE nor the access node has a height measurement capability, as shown in FIG. 6, the network side may search, according to the node identifier of the access node of the user equipment and the receive power information of the user equipment, the database for height information of user equipment corresponding to the node identifier and the receive power information.

For example, Table 5 lists low-power node information uploaded, to a base station, by UE having no height measurement capability.

TABLE 5

| Measurement Time | UE Identifier | Low-Power Access Node Identifier | Receive Power (dBm) |
|---|---|---|---|
| Dec. 2, 2012 12:30:20 | UE_3 | AP_1 | −80 |
| | | AP_2 | −63 |
| | | AP_3 | −87 |

The network side queries a historical record according to the low-power access node information reported by the UE, so as to obtain a height reporting record around these low-power nodes, and uses a historical record with best matched low-power access node information and height information corresponding to the low-power access node as height information of the UE.

For a network side historical record, reference may be made to Table 4, and a degree of a match between "low-power access node identifier and receive power" of a first record and "low-power access node identifier and receive power" reported by UE_3 is the highest. Therefore, the network side uses a 15-meter height of UE_1 as a height of UE_3.

According to the foregoing embodiment, a network side can obtain height information of user equipment in time, so that the network side performs defined radio signal coverage according to an actual requirement.

Figure 7:
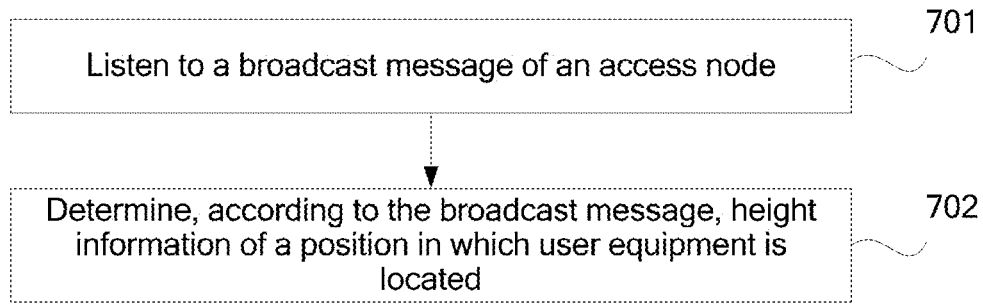
FIG. 7 is a flowchart of an embodiment of a height information obtaining method according to the present invention.

The foregoing embodiment is dedicated for a case in which a network side requires a height of UE and for a scenario in which the UE does not have a height measurement capability but the UE needs to obtain height information of the UE. An embodiment of the present invention provides a height information obtaining method. FIG. 7 is a flowchart of this embodiment. As shown in FIG. 7, the method includes:

701. The user equipment listens to a broadcast message of an access node, where the broadcast message includes a node identifier of the access node and receive power information of the user equipment for the access node.

702. Determine, according to the broadcast message, height information of a position in which the user equipment is located.

Figure 8:
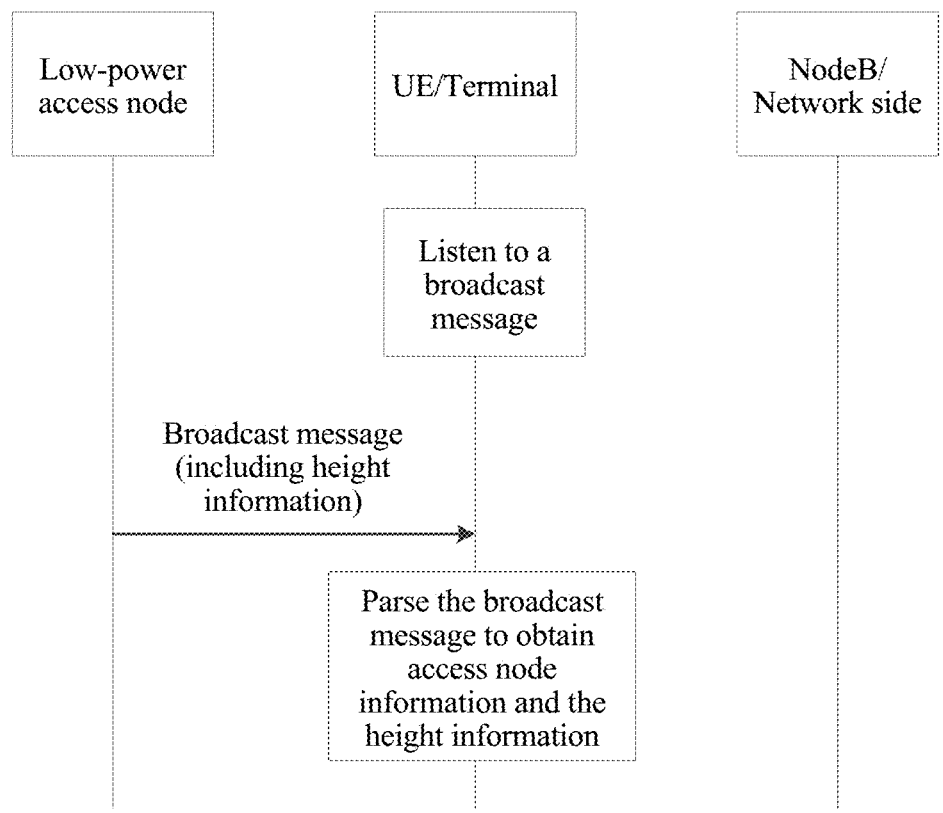
FIG. 8 is an interaction state diagram of an embodiment of a height information obtaining method according to the present invention.

In an embodiment, as shown in FIG. 8, if the access node includes a height measurement module, and the access node has a height measurement capability, the broadcast message includes height information of a position in which the access node is located. When obtaining, by means of listening, broadcast messages of multiple different access nodes, the user equipment selects, according to values of receive powers for receiving different access node signals by the user equipment, height information sent by an access node with a maximum receive power as the height information of the position in which the user equipment is located.

Figure 9:
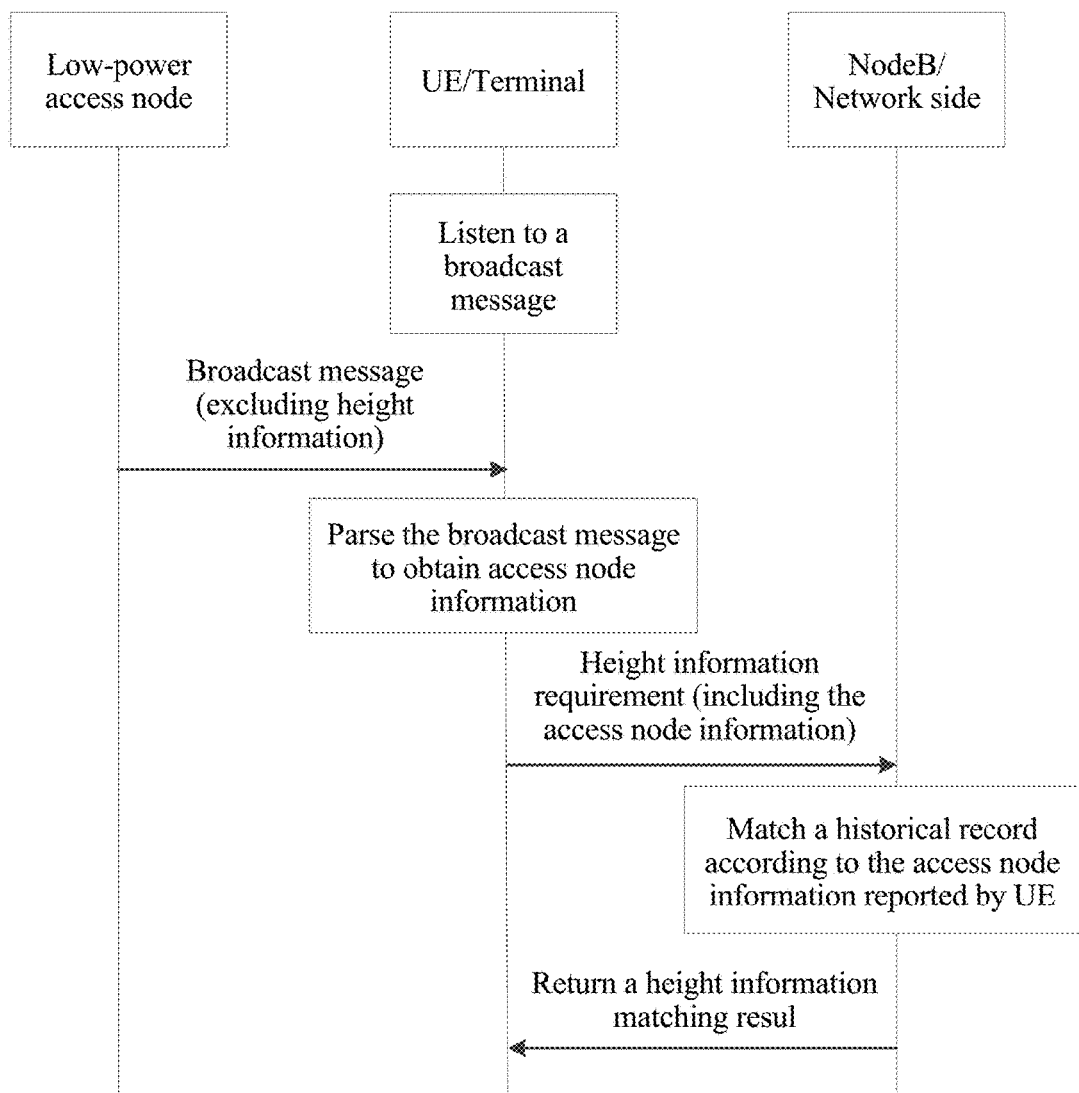
FIG. 9 is an interaction state diagram of an embodiment of a height information obtaining method according to the present invention.

In another embodiment, the access node does not have a height measurement capability, reference may be made to FIG. 9. After receiving the broadcast message of the access node, the UE selects a low-power access node with a maximum receive power as the access node, and sends height requirement information to a base station, where the height requirement information includes a node identifier of the access node and receive power information of the user equipment for the access node.

A network side searches, according to the node identifier of the access node and the receive power information of the user equipment for the access node, a database for a historical record, and then sends a response message to the UE, where the response message includes the height information of the position in which the user equipment is located, for which reference may be made to the embodiment shown in Table 4.

According to this embodiment, UE can obtain height information of the UE in time when the UE does not have a height measurement capability.

Figure 10:
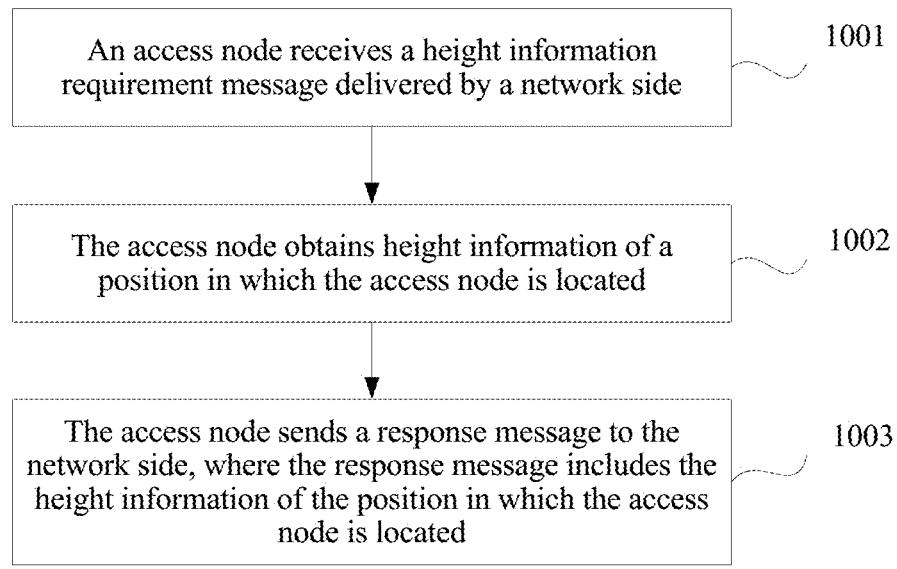
FIG. 10 is a flowchart of an embodiment of a height information obtaining method according to the present invention.

In addition, as shown in FIG. 10, when a network side needs height information of an access node, an embodiment of the present invention further provides a height information obtaining method, where the method includes:

1001. An access node receives a first height information requirement message delivered by the network side, where the first height information requirement message is used to obtain height information of a position in which the access node is located.

1002. The access node obtains the height information of the position in which the access node is located.

1003. The access node sends a response message to the network side, where the response message includes the height information of the position in which the access node is located.

When the access node has a height information measurement capability, the height information, obtained by the access node, of the position in which the access node is located is height information, measured by the access node, of the position in which the access node is located.

When the access node does not have a height information measurement capability, the obtaining, by the access node, the height information of the position in which the access node is located specifically includes:

sending, by the access node, a second height information requirement message to user equipment, where the user equipment is located in a signal coverage area of the user node, and the second height information requirement message is used to obtain height information of a position in which the user equipment is located; and receiving a response message reported by the user equipment, where the response message includes the height information of the position in which the user equipment is located; and using the height information of the position in which the user equipment is located as the height information of the position in which the access node is located.

Figure 11:
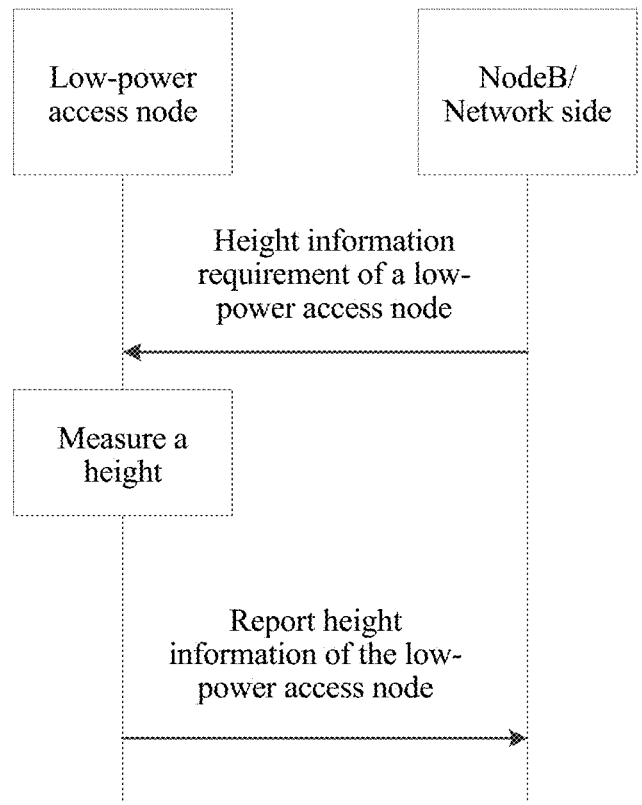
FIG. 11 is an interaction state diagram of an embodiment of a height information obtaining method according to the present invention.

In an embodiment, when the access node has a height measurement module, and the access node can communicate with a network side NodeB, as shown in FIG. 11, the access node obtains, according to a result from the height measurement module, the height information of the position in which the access node is located, and then sends a response message to the network side, where the response message includes the height information of the position in which the access node is located.

Figure 12:
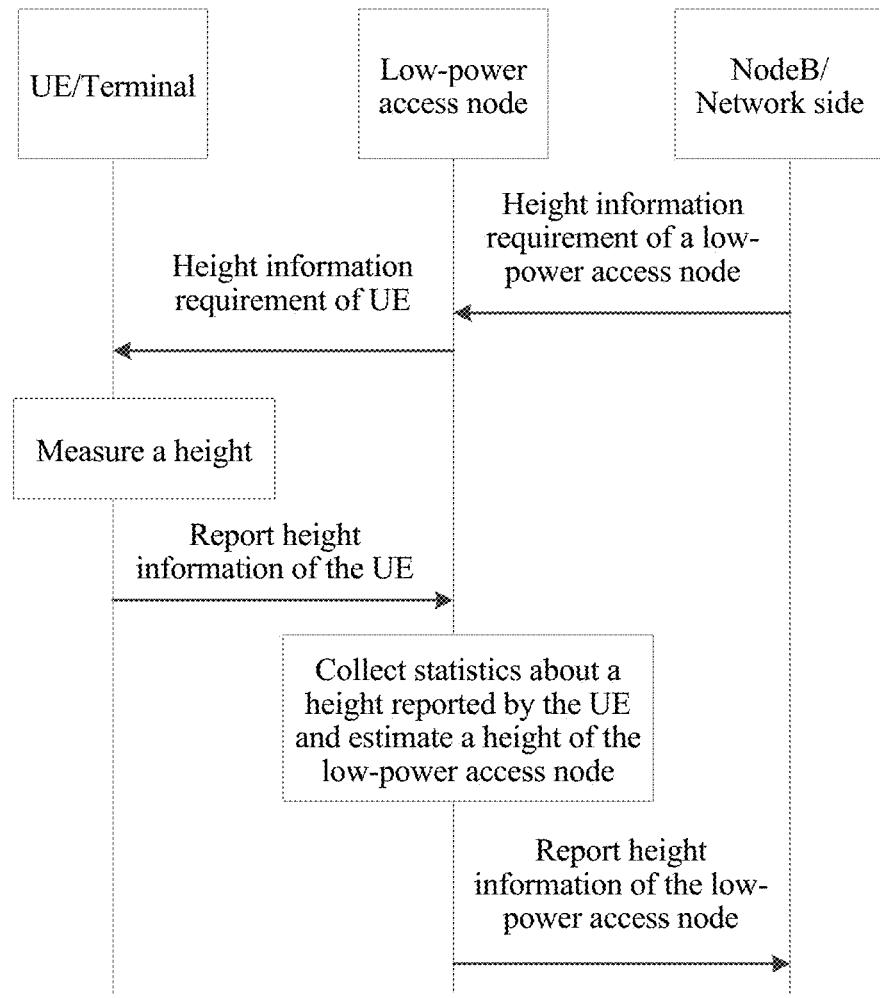
FIG. 12 is an interaction state diagram of an embodiment of a height information obtaining method according to the present invention.

In another embodiment, the access node does not have a height measurement capability; however, UE that establishes a connection with the access node has a height measurement capability. In this case, reference may be made to FIG. 12; the access node sends a fourth height information requirement message to the user equipment, where the user equipment accesses the user node, and the fourth height information requirement message is used to obtain height information of a position in which the user equipment is located.

Then, the access node receives a response message reported by the user equipment, where the response message includes the height information of the position in which the user equipment is located.

Finally, the access node uses the height information of the position in which the user equipment is located as the height information of the position in which the access node is located.

According to the foregoing embodiment, a network side can obtain power information of a low-power access node in time.

Figures 13, 14:
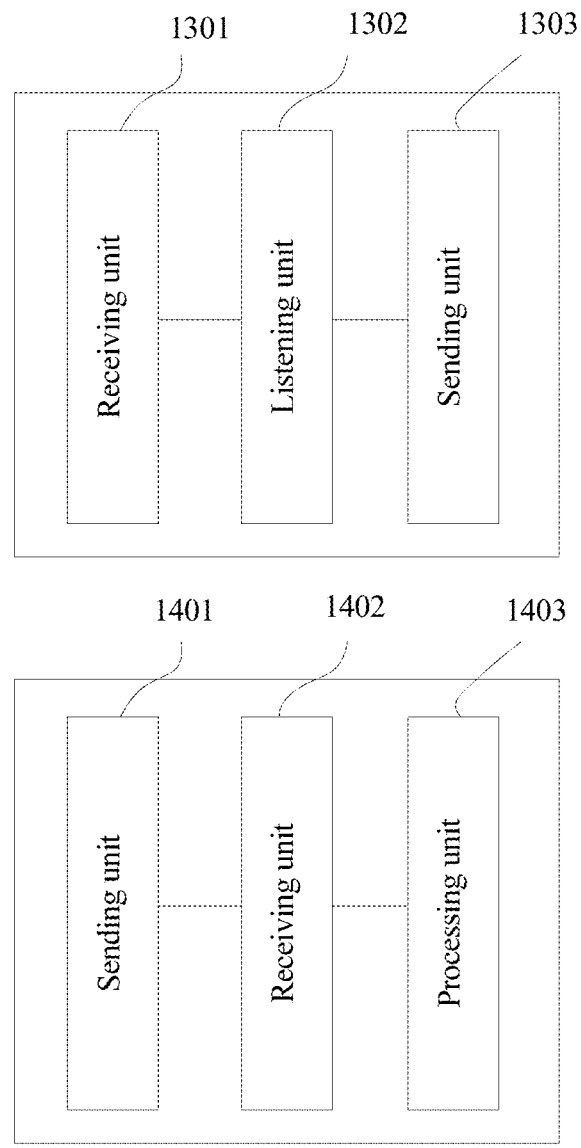
FIG. 13 is a structural diagram of an embodiment of user equipment according to the present invention.
FIG. 14 is a structural diagram of an embodiment of a base station according to the present invention.

Correspondingly, an embodiment of the present invention further provides user equipment. As shown in FIG. 13, the user equipment includes:

a receiving unit 1301, configured to receive a height requirement message sent by a network side device, where the height requirement message is used to obtain height information of a position in which the user equipment is located;

a listening unit 1302, configured to listen to a broadcast message sent by an access node, where the broadcast message includes a node identifier of the access node and receive power information for receiving the access node signal by the user equipment; and a sending unit 1303, configured to send a response message to the network side device, where the response message includes a node identifier of an access node of the user equipment and the receive power information of the user equipment, so that the network side determines, according to the response message, the height information of the position in which the user equipment is located. In an embodiment, the access node has a height measurement module, the broadcast message includes height information of a position in which the access node is located, and the user equipment further includes:

a processing unit, configured to use the height information of the position in which the access node is located as the height information of the position in which the user equipment is located; and the response message sent by the sending unit to the network side further includes the height information of the position in which the user equipment is located.

For a working process of the UE in this embodiment, reference may be made to the embodiment shown in FIG. 3, and details are not described.

In another embodiment, the user equipment has a height measurement module that is configured to obtain the height information of the position in which the user equipment is located, and the response message sent by the sending unit to the network side further includes the height information of the position in which the user equipment is located.

For a specific description of this embodiment, reference may be made to the embodiment shown in FIG. 5, and details are not described.

In addition, when the access node has a height measurement module, the broadcast message further includes height information of a position in which the access node is located, and the user equipment further includes:

a selection unit, configured to: when the user equipment receives broadcast messages of different access nodes, select, according to values of receive powers for receiving different access node signals by the user equipment, height information sent by an access node with a maximum receive power as the height information of the position in which the user equipment is located.

According to the foregoing embodiment, a network side can precisely obtain height information of user equipment in time.

As shown in FIG. 14, an embodiment of the present invention further provides a base station, where the base station includes:

a sending unit 1401, configured to send a first height requirement message to user equipment, where the first height requirement message is used to obtain height information of a position in which the user equipment is located;

a receiving unit 1402, configured to receive a response message sent by the user equipment, where the response message includes a node identifier of an access node of the user equipment and receive power information for receiving the access node signal by the user equipment; and a processing unit 1403, configured to determine, according to the response message of the user equipment, the height information of the position in which the user equipment is located.

In an embodiment, the access node has a height measurement module, the broadcast message further includes height information of the access node, and the response message further includes the height information of the position in which the user equipment is located, where the height information of the position in which the user equipment is located is height information of an access node that is selected by the user equipment according to values of receive powers of the different access nodes and that has a maximum receive power.

For a more specific description, reference may be made to the embodiment shown in FIG. 3, and details are not described.

In an embodiment, the user equipment has a height measurement module, and the user equipment obtains, according to a measurement result from the height measurement module, the height information of the position in which the user equipment is located. A response message sent by the user equipment to the network side further includes the height information of the position in which the user equipment is located.

The processing unit 1403 determines, from the response message, the height information of the position in which the user equipment is located.

For a specific description of this embodiment, reference may be made to the embodiment shown in FIG. 5, and details are not described.

In another embodiment, the network side device further includes a storage unit, configured to store height information of a position in which each user equipment is located, the node identifier of the access node of the user equipment, and the receive power information for receiving the access node signal by the user equipment, so as to establish a query database.

Assuming that neither the UE nor the access node has a height measurement capability, the processing unit 1403 searches, according to the node identifier of the access node of the user equipment and the receive power information of the user equipment, the database for height information of user equipment corresponding to the node identifier and the receive power information, for which reference may be made to the embodiment shown in FIG. 4.

According to the foregoing embodiment, a network side may obtain height information of user equipment in time.

Figure 15:
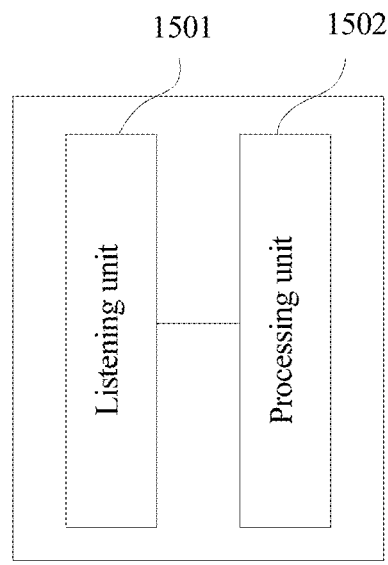
FIG. 15 is a structural diagram of an embodiment of user equipment according to the present invention.

As shown in FIG. 15, an embodiment of the present invention further provides user equipment, where the user equipment includes:

a listening unit 1501, configured to listen to a broadcast message of an access node, where the broadcast message includes a node identifier of the access node and receive power information of the user equipment for the access node; and a processing unit 1502, configured to determine, according to the broadcast message, height information of a position in which the user equipment is located.

In an embodiment, the access node includes a height measurement module, and the broadcast message includes height information of a position in which the access node is located.

The processing unit 1502 uses the height information of the position in which the access node is located as the height information of the position in which the user equipment is located.

Alternatively, the broadcast message further includes height information of a position in which the access node is located; and the user equipment further includes a selection unit, configured to: when the user equipment obtains, by means of listening, broadcast messages of multiple different access nodes, select, according to values of receive powers for receiving different access node signals by the user equipment, height information sent by an access node with a maximum receive power as the height information of the position in which the user equipment is located.

For a specific implementation manner, reference may be made to the embodiment shown in FIG. 8, and details are not described.

In another embodiment, when the access node does not have a height measurement capability, either, the processing unit 1502 further includes:

a sending unit, configured to send height requirement information to a base station, where the height requirement information includes the node identifier of the access node and the receive power information of the user equipment for the access node; and a receiving unit, configured to receive a response message returned by the base station, where the response message includes the height information of the position in which the user equipment is located.

For a specific implementation manner, reference may be made to the embodiment shown in FIG. 9, and details are not described.

According to the foregoing embodiment, user equipment may obtain height information of the user equipment in time.

Figure 16:
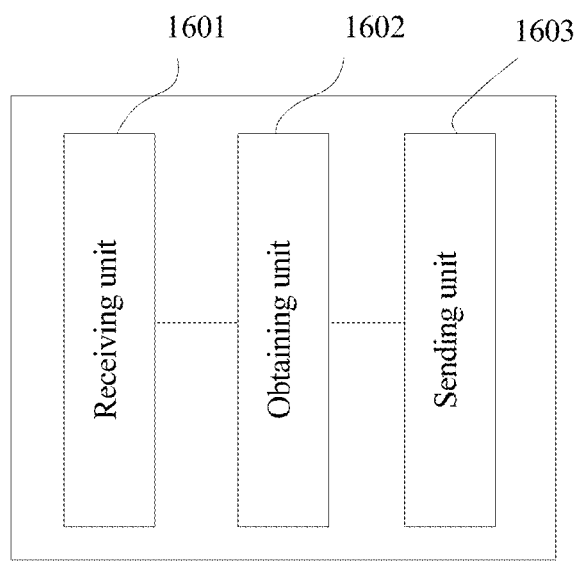
FIG. 16 is a structural diagram of an embodiment of an access node method according to the present invention.

As shown in FIG. 16, an embodiment of the present invention further provides an access point, where the access point includes:

a receiving unit 1601, configured to receive a first height information requirement message delivered by a network side, where the first height information requirement message is used to obtain height information of a position in which the access node is located;

an obtaining unit 1602, configured to obtain the height information of the position in which the access node is located; and a sending unit 1603, configured to send a response message to the network side, where the response message includes the height information of the position in which the access node is located.

In an embodiment, the access node has a height measurement module that is configured to obtain the height information of the position in which the access node is located, and sends the height information to the obtaining unit.

For this embodiment, reference may be made to the embodiment shown in FIG. 10, and details are not described.

In another embodiment, when the access node does not have a height measurement capability, the obtaining unit 1302 further includes:

a requirement sending unit, configured to send, by the access node, a second height information requirement message to user equipment, where the user equipment is located in a signal coverage area of the user node, and the second height information requirement message is used to obtain height information of a position in which the user equipment is located;

a response receiving unit, configured to receive a response message reported by the user equipment, where the response message includes the height information of the position in which the user equipment is located; and a processing unit, configured to use the height information of the position in which the user equipment is located as the height information of the position in which the access node is located.

For a specific implementation manner of this embodiment, reference may be made to a detailed description of the foregoing embodiment in FIG. 9.

According to this embodiment, a network side may obtain height information of an access node in time.

Figure 17:
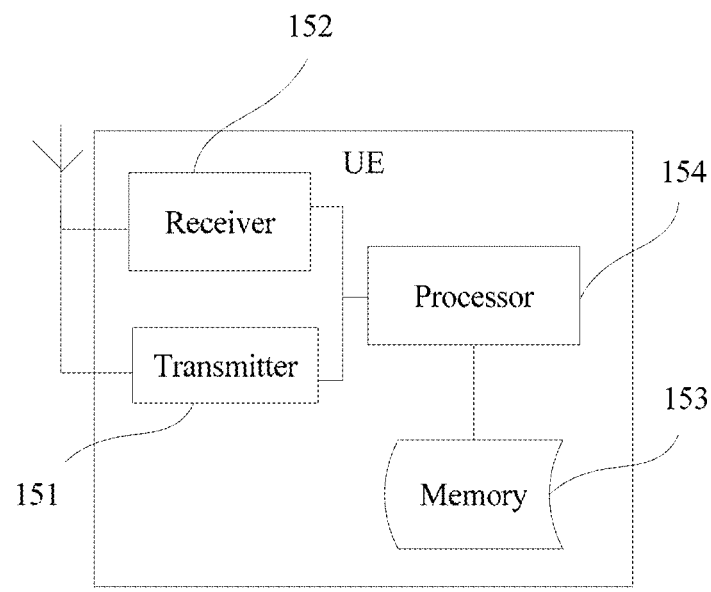
FIG. 17 is a structural diagram of an embodiment of user equipment according to the present invention.

As shown in FIG. 17, an embodiment of the present invention further provides user equipment, where the user equipment includes a transmitter 151, a receiver 152, a memory 153, and a processor 154 separately connected to the transmitter 151, the receiver 152, and the memory 153. Certainly, the user equipment may further include general components such as an antenna, a baseband processing component, an intermediate radio frequency processing component, and an input and output apparatus, and no limitation is set in this embodiment of the present invention.

The memory 153 stores a group of program code, and the processor 154 is configured to invoke the program code stored in the memory 153, so as to execute the following operations:

receiving, by using the receiver 152, a height requirement message sent by a network side device, where the height requirement message is used to obtain height information of a position in which the user equipment is located;

listening to, by using the receiver, a broadcast message of an access node, where the broadcast message includes a node identifier of the access node and receive power information for receiving the access node signal by the user equipment; and sending, by using the transmitter 151, a response message to the network side device, where the response message includes a node identifier of an access node of the user equipment and the receive power information of the user equipment, so that the network side determines, according to the response message, the height information of the position in which the user equipment is located.

In an implementation manner, the broadcast message further includes height information of a position in which the access node is located.

The response message sent by the transmitter to the network side further includes the height information of the position in which the user equipment is located, where the height information of the position of the user equipment is the height information of the position in which the access node is located.

In another implementation manner, the broadcast message further includes height information of a position in which the access node is located.

When the user equipment receives broadcast messages of different access nodes, the processor selects, according to values of receive powers for receiving different access node signals by the user equipment, height information sent by an access node with a maximum receive power as the height information of the position in which the user equipment is located.

In another embodiment, the user equipment may further obtain, by means of measurement, the height information of the position in which the user equipment is located.

The response message sent by the transmitter to the network side further includes the height information of the position in which the user equipment is located.

Figure 18:
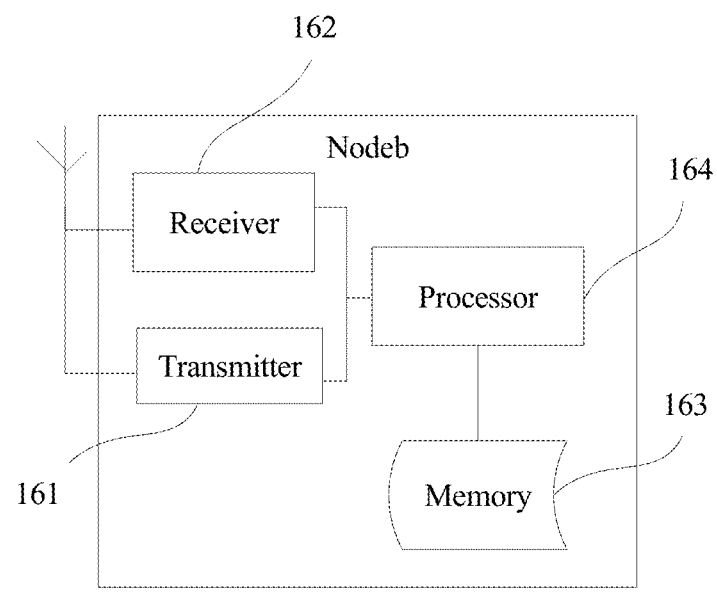
FIG. 18 is a structural diagram of an embodiment of a base station according to the present invention.

As shown in FIG. 18, an embodiment of the present invention further provides a network side device, where the network side device includes a transmitter 161, a receiver 162, a memory 163, and a processor 164 separately connected to the transmitter 161, the receiver 162, and the memory 163. Certainly, a base station may further include general components such as an antenna, a baseband processing component, an intermediate radio frequency processing component, and an input and output apparatus, and no limitation is set in this embodiment of the present invention.

The memory 163 stores a group of program code, and the processor 164 is configured to invoke the program code stored in the memory 163, so as to execute the following operations:

sending, by using the transmitter, a height requirement message to user equipment, where the height requirement message is used to obtain height information of a position in which the user equipment is located; and receiving, by using the receiver, a response message sent by the user equipment, where the response message includes a node identifier of an access node of the user equipment and receive power information for receiving the access node signal by the user equipment.

In an implementation manner, the broadcast message further includes height information of the access node, and the response message further includes the height information of the position in which the user equipment is located, where the height information of the position in which the user equipment is located is determined by the user equipment according to the height information of the access node.

In an implementation manner, the broadcast message further includes height information of the access node, and the response message further includes the height information of the position in which the user equipment is located, where the height information of the position in which the user equipment is located is height information of an access node that is selected by the user equipment according to values of receive powers of the different access nodes and that has a maximum receive power.

In an implementation manner, the response message further includes the height information of the position in which the user equipment is located, where the height information is obtained by the user equipment by means of measurement.

In an implementation manner, the memory stores height information of a position in which each user equipment is located, the node identifier of the access node of the user equipment, and the receive power information for receiving the access node signal by the user equipment.

In an implementation manner, the processor searches, according to the node identifier of the access node of the user equipment and the receive power information for receiving the access node signal by the user equipment, for height information of user equipment corresponding to the node identifier and the receive power information.

Figure 19:
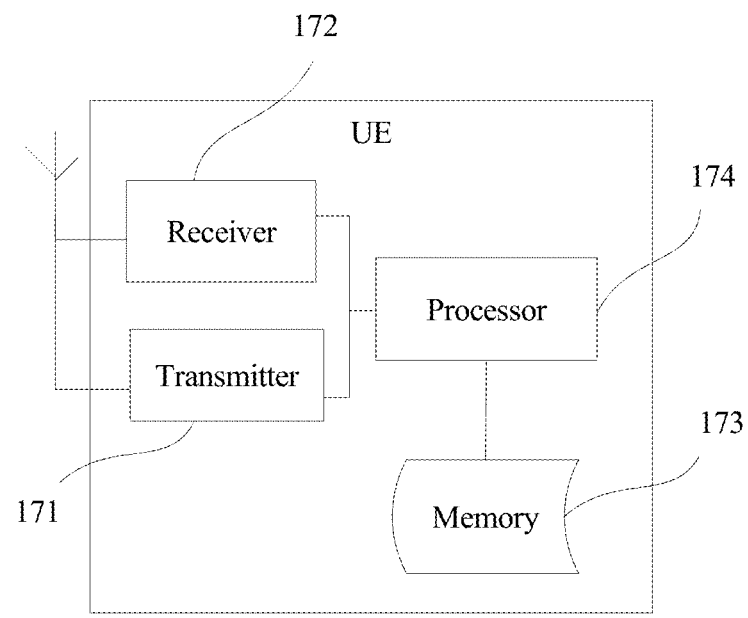
FIG. 19 is a structural diagram of an embodiment of user equipment according to the present invention.

As shown in FIG. 19, an embodiment of the present invention further provides user equipment, where the user equipment includes a transmitter 171, a receiver 172, a memory 173, and a processor 174 separately connected to the transmitter 171, the receiver 172, and the memory 173. Certainly, the user equipment may further include general components such as an antenna, a baseband processing component, an intermediate radio frequency processing component, and an input and output apparatus, and no limitation is set in this embodiment of the present invention. The memory 173 stores a group of program code, and the processor 174 is configured to invoke the program code stored in the memory 173, so as to execute the following operations:

listening to, by using the receiver, a broadcast message of an access node, where the broadcast message includes a node identifier of the access node and receive power information of the user equipment for the access node; and determining, by the processor according to the broadcast message, height information of a position in which the user equipment is located.

In an embodiment, the broadcast message further includes height information of a position in which the access node is located; and the determining, by the user equipment according to the broadcast information, height information of a position in which the user equipment is located includes:

determining, by the user equipment, that the height information of the position in which the access node is located is the height information of the position in which the user equipment is located.

In an embodiment, the broadcast message further includes height information of a position in which the access node is located, and when obtaining, by means of listening, broadcast messages of multiple different access nodes, the user equipment selects, according to values of receive powers for receiving different access node signals by the user equipment, height information sent by an access node with a maximum receive power as the height information of the position in which the user equipment is located.

In an embodiment, the determining, according to the broadcast message, height information of a position in which the user equipment is located specifically includes:

sending height requirement information to a base station, where the height requirement information includes the node identifier of the access node and the receive power information of the user equipment for the access node; and receiving a response message returned by the base station, where the response message includes the height information of the position in which the user equipment is located.

Figure 20:
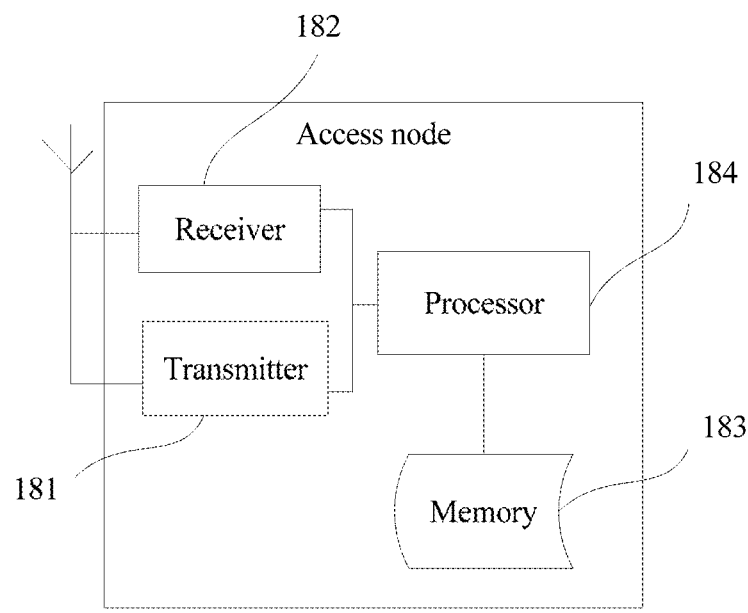
FIG. 20 is a structural diagram of an embodiment of an access node according to the present invention.

As shown in FIG. 20, an embodiment of the present invention further provides an access node, where the access node includes a transmitter 181, a receiver 182, a memory 183, and a processor 184 separately connected to the transmitter 181, the receiver 182, and the memory 183. Certainly, the access node may further include general components such as an antenna, a baseband processing component, an intermediate radio frequency processing component, and an input and output apparatus, and no limitation is set in this embodiment of the present invention.

The memory 183 stores a group of program code, and the processor 184 is configured to invoke the program code stored in the memory 183, so as to execute the following operations:

receiving, by using the receiver, a first height information requirement message delivered by a network side, where the first height information requirement message is used to obtain height information of a position in which the access node is located;

obtaining, by the access node, the height information of the position in which the access node is located; and sending, by using the transmitter, a response message to the network side, where the response message includes the height information of the position in which the access node is located.

In an embodiment, the access node has a height measurement module, and the processor obtains, according to a result from the height measurement module, height information of a position in which the access node is located.

In another embodiment, the processor controls the transmitter to send a fourth height information requirement message to user equipment, where the user equipment accesses the user node, and the fourth height information requirement message is used to obtain height information of a position in which the user equipment is located.

The processor receives, by using the receiver, a response message reported by the user equipment, where the response message includes the height information of the position in which the user equipment is located.

The processor determines, according to the height information of the position in which the user equipment is located, the height information of the position in which the access node is located.

According to the foregoing embodiment, a network side can obtain height information of an access node in time.

Persons skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

The following describes several embodiments in which a network side of the present invention requires height information of UE.

A low-power access node integrates a height measurement module.

The height measurement module is integrated in the low-power access node, and the low-power access node may obtain current height information from the height measurement module. In this case, the low-power access node has a height measurement capability.

The low-power access node periodically adds the current height information into a broadcast message, and periodically broadcasts a height of the low-power access node.

When the network side requires the height information of the UE, there are the following several application manners:

First manner: A low-power access node has a height measurement capability, and the UE does not have a height measurement capability.

|  | Low-Power Access Node | UE (Terminal) |
| --- | --- | --- |
| Height measurement capability | Yes | No |

1. The network side sends a height information requirement message to the UE by using a NodeB.
2. The UE camps on the low-power node and automatically reads a broadcast message (a cellular network), or the UE enables listening to a broadcast message of the low-power access node (WiFi).
3. The low-power access node broadcasts, to the UE, a broadcast message including height information.
4. The UE parses the broadcast message to obtain low-power access node information and the height information.

The following table lists surrounding low-power access node information received by the UE.

| Low-Power Access Node Identifier | Receive Power (dBm) | Height (m) |
| --- | --- | --- |
| AP_1 | −78 | 18 |
| AP_2 | −65 | 15 |
| AP_3 | −90 | 9 |

The UE selects a height of a low-power access node with a highest power as a height of the UE, for example, 15 meters.

5. The UE reports the height information and the low-power access node information to the NodeB and the network side.

A message reported by the UE includes a measured low-power access node identifier, and a corresponding power, a corresponding height, the height information of the UE, and a measurement time.

6. The network side stores the height information and the low-power access node information that are reported by the UE.

| Measurement Time | UE Identifier | Height of UE (m) | Low-Power Access Node Identifier | Receive Power (dBm) | Height (m) |
| --- | --- | --- | --- | --- | --- |
| Dec. 2, 2012 12:02:20 | UE_1 | 15 | AP_1 | −78 | 18 |
|  |  |  | AP_2 | −65 | 15 |
|  |  |  | AP_3 | −90 | 9 |
| Dec. 2, 2012 12:20:02 | UE_2 | 9 | AP_3 | −63 | 9 |
|  |  |  | AP_4 | −80 | 6 |

The low-power access node periodically sends a broadcast message, which has no time sequence relationship with enabling, by the UE, listening to a broadcast message.

Second manner: A low-power access node does not have a height measurement capability, and the UE has a height measurement capability.

|  | Low-Power Access Node | UE (Terminal) |
| --- | --- | --- |
| Height measurement capability | No | Yes |

1. The network side sends a height information requirement message to the UE by using a NodeB.
2. The UE measures height information; (optional) the UE enables listening to a broadcast message of the low-power access node.
3. (Optional) The low-power access node broadcasts a broadcast message (excluding the height information) to the UE.
4. (Optional) The UE parses the broadcast message to obtain low-power access node information.

The following table lists surrounding low-power access node information received by the UE.

| Low-Power Access Node Identifier | Receive Power (dBm) | Height (m) |
| --- | --- | --- |
| AP_1 | −78 | — |
| AP_2 | −65 | — |
| AP_3 | 90 | — |

5. The UE reports the height information and (optional) the low-power access node information to the NodeB and the network side.

6. The network side stores the height information and (optional) the low-power access node information that are reported by the UE.

| Measurement Time | UE Identifier | Height of UE (m) | Low-Power Access Node Identifier | Receive Power (dBm) | Height (m) |
|---|---|---|---|---|---|
| Dec. 2, 2012 12:02:20 | UE_1 | 15 | AP_1 | −78 | |
| Dec. 2, 2012 | | | AP_2 | −65 | |
| 2012/12/02 12:20:02 | UE_2 | 9 | AP_3 | −90 | |
| | | | AP_3 | −63 | |
| | | | AP_4 | −80 | |

Third manner: Neither a low-power access node nor the UE has a height measurement capability.

| | Low-Power Access Node | UE (Terminal) |
|---|---|---|
| Height measurement capability | No | No |

1. The network side sends a height information requirement message to the UE by using a NodeB.
2. The UE enables listening to a broadcast message of the low-power access node.
3. The low-power access node broadcasts a broadcast message (excluding the height information) to the UE.
4. The UE parses the broadcast message to obtain low-power access node information.

| Low-Power Access Node Identifier | Receive Powder (dBm) | Height (m) |
|---|---|---|
| AP_1 | −80 | — |
| AP_2 | −63 | — |
| AP_3 | −87 | — |

5. The UE reports the low-power access node information to the NodeB and the network side.
A reported message is as follows.

| Measurement Time | UE Identifier | Low-Power Access Node Identifier | Receive Power (dBm) |
|---|---|---|---|
| Dec. 2, 2012 12:30:20 | UE_3 | AP_1 | −80 |
| | | AP_2 | −63 |
| | | AP_3 | −87 |

6. The network side queries a historical record according to the low-power access node information reported by the UE, so as to obtain a height reporting record around these low-power nodes, and uses a historical record with best matched low-power access node information and height information corresponding to the low-power access node as the height information of the UE.
The network side historical record is as follows.

| Measurement Time | UE Identifier | Height of UE (m) | Low-Power Access Node Identifier | Receive Power (dBm) | Height (m) |
|---|---|---|---|---|---|
| Dec. 2, 2012 12:02:20 | UE_1 | 15 | AP_1 | −78 | 18 |
| | | | AP_2 | −65 | 15 |
| | | | AP_3 | −90 | 9 |
| Dec. 2, 2012 12:20:02 | UE_2 | 9 | AP_3 | −63 | 9 |
| | | | AP_4 | −80 | 6 |

A degree of a match between "low-power access node identifier and receive power" of a first record and "low-power access node identifier and receive power" reported by UE_3 is the highest. Therefore, the network side uses a 15-meter height of UE_1 as a height of UE_3.

The following describes several embodiments in which UE of the present invention requires height information of the UE. The UE requires the height information (the UE does not have a height measurement capability).

First manner: A low-power access node has a height measurement capability.

| | Low-Power Access Node | UE (Terminal) |
|---|---|---|
| Height measurement capability | Yes | No |

1. The UE enables listening to a broadcast message of the low-power access node.
2. The low-power access node broadcasts a broadcast message (including height information) to the UE.
3. The UE parses the broadcast message to obtain low-power access node information and the height information.

Second manner: A low-power access node does not have a height measurement capability.

| | Low-Power Access Node | UE (Terminal) |
|---|---|---|
| Height measurement capability | No | No |

1. The UE enables listening to a broadcast message of the low-power access node.
2. The low-power access node broadcasts a broadcast message (excluding the height information) to the UE.
3. The UE parses the broadcast message to obtain low-power access node information.
4. The UE sends a height information request message to a NodeB and a network side, and reports the low-power access node information.
5. The network side queries a historical record according to the low-power access node information reported by the UE, so as to obtain a height reporting record around these low-power nodes, and uses a historical record with best matched low-power access node information and height information corresponding to the low-power access node as the height information of the UE.
6. The NodeB and the network side send matched height information to the UE.

The following describes that a network side of the present invention requires height information of a low-power access node.

First manner: The low-power access node has a height measurement capability, and the low-power access node may directly communicate with the network side.

|  | Low-Power Access Node | UE (Terminal) |
|---|---|---|
| Height measurement capability | Yes | — |

1. The network side sends a height information requirement message to the low-power access node.

2. The low-power access node measures height information.

3. The low-power access node reports the height information to the network side.

4. The network side stores low-power access node information and the height information of the low-power access node.

Second manner: The low-power access node does not have a height measurement capability, the low-power access node may directly communicate with the network side, and a terminal has a height measurement capability.

|  | Low-Power Access Node | UE (Terminal) |
|---|---|---|
| Height measurement capability | No | Yes |

1. The network side sends a height information requirement message to the low-power access node.

2. The low-power access node sends a height information requirement message to UE that is in a coverage area of the low-power access node.

3. The UE measures a height.

4. The UE reports the height of the UE to the low-power access node.

5. The low-power access node collects statistics about reported heights in a period of time, and estimates a height value as a height of the low-power access node (for example, using an average value or a median).

6. The low-power access node reports height information to the network side.

Third manner: The low-power access node cannot directly communicate with the network side.

The low-power access node cannot directly communicate with the network side. A method for reporting a position by UE in "Embodiment 2" may be used, and the network side then collects statistics about height information and low-power access node information that are reported by the UE, and obtains by means of estimation a height of the low-power access node (for example, using an average value or a median).

The following describes applications of beneficial effects brought by the technical solution of the present invention.

Application 1: Precise Energy Delivery of a 3D Narrow Beam.

A network side obtains height information and plane position information (in the prior art) that are reported by a terminal, which is equal to obtaining a three-dimensional space position of the terminal. In this case, the network side may enable a base station to implement precise coverage by targeting a narrow beam to the three-dimensional space position of the terminal, so as to improve signal quality of each terminal. In addition, this precise energy delivery not only saves energy but also reduces interference with another terminal.

1. The terminal is handed over to a base station range having 3D Beamforming.

2. The base station delivers message signaling to request the terminal to report a report related to a position and height measurement.

3. The terminal measures a broadcast message (including height information) of a surrounding WiFi access point, and reports the broadcast message to the base station.

4. The base station receives the height information reported by the terminal.

5. (Prior art) The base station estimates a plane position of the terminal according to surrounding WiFi access point information reported by the terminal.

6. The base station obtains 3D coordinates of the terminal by combining the height information and the plane position information that are of the terminal.

7. The base station calculates relative 3D positions of a transmit antenna of the base station and the terminal.

8. (Prior art) The base station calculates, according to the relative 3D positions of the base station and the terminal, a required 3D Beamforming configuration, and performs 3D-narrow-beam coverage on the terminal.

Application 2: Precise Deployment of Drip Irrigation Coverage of a Small Cell.

A network side obtains height information and plane position information (in the prior art) that are reported by a terminal, which is equal to obtaining a three-dimensional space position of the terminal. The network side collects statistics about three-dimensional distribution of the terminal in a period of time, so as to obtain service hotspot areas with many service requirements. An offloading low-power base station may be arranged in these places, to implement drip irrigation coverage in the service hotspot areas. In this case, terminal user experience of a hotspot area is improved, and in addition, not only a load of a macro base station but also interference with another area are reduced.

Application 3: 3D Position Application of a Terminal.

The terminal obtains height information and plane position information (in the prior art), which is equal to obtaining a three-dimensional space position of the terminal. Some applications based on a position may be implemented, for example, indoor navigation, precise advertising, and the like.

What is claimed is:

1. A method comprising:

receiving, by a user equipment, a height information requirement message sent by a network side device, wherein the height information requirement message causes the user equipment to obtain a height of a first position in which the user equipment is located;

receiving, by the user equipment, a broadcast message from an access node, wherein the broadcast message comprises a node identifier of the access node and is received with a receive power by the user equipment; and sending, by the user equipment in response to receiving the height information requirement message, a response message to the network side device, wherein the response message comprises the node identifier of the access node and receive power information comprising the receive power of the user equipment, the response message configured to cause the network side device to determine the height of the first position in which the user equipment is located according to the node identifier of the access node and the receive power information of the user equipment.

2. The method according to claim 1, wherein:
the broadcast message further comprises a second height information of a second position in which the access node is located;
the response message sent by the user equipment to the network side device further comprises a first height information of the first position in which the user equipment is located; and
the first height information of the first position of the user equipment is the second height information of the second position in which the access node is located.

3. The method according to claim 1, wherein:
the broadcast message further comprises second height information of a second position in which the access node is located; and
the method further comprises:
  selecting, by the user equipment in response to receiving a plurality of broadcast messages from a plurality of access nodes, according to a plurality of receive power values corresponding to the plurality of access nodes, height information corresponding to a selected access node of the plurality of access nodes, with a maximum receive power value, as a first height information of the first position in which the user equipment is located.

4. The method according to claim 1, wherein:
the method further comprises obtaining, by the user equipment, a measurement of a first height information of the first position in which the user equipment is located; and
the response message sent by the user equipment to the network side device further comprises the first height information of the first position in which the user equipment is located.

5. A method comprising:
sending, by a network side device, a height requirement message to a user equipment, wherein the height requirement message requests a height information of a position in which the user equipment is located;
receiving, by the network side device in response to sending the height requirement message, a response message sent by the user equipment, wherein the response message comprises a node identifier of an access node and a receive power information of the user equipment; and
determining, by the network side device, a height of the position in which the user equipment is located according to the node identifier of the access node and the receive power information of the user equipment.

6. The method according to claim 5, wherein:
a broadcast message sent by the access node comprises second height information of the access node; and
the response message further comprises first height information of the position in which the user equipment is located, wherein the first height information of the position in which the user equipment is located is determined according to the second height information of the access node.

7. The method according to claim 5, wherein:
a broadcast message sent by a selected access node comprises second height information of the selected access node; and
the response message further comprises first height information of the position in which the user equipment is located, wherein the first height information of the position in which the user equipment is located is the second height information of the selected access node, and wherein the selected access node selected, by the user equipment, according to a maximum receive power value of a plurality of receive power values corresponding to a plurality of access nodes comprising the selected access node.

8. The method according to claim 5, wherein:
the response message further comprises height information of the position in which the user equipment is located; and
the height information of the position in which the user equipment is located is obtained by the user equipment by a measurement.

9. A method comprising:
receiving, by a user equipment, a broadcast message from an access node, wherein the broadcast message comprises a node identifier of the access node and is received with a receive power by the user equipment; and
determining, by the user equipment, according to the broadcast message, a first height information of a first position in which the user equipment is located according to the node identifier of the access node and a receive power information of the user equipment comprising the receive power.

10. The method according to claim 9, wherein:
the broadcast message further comprises a second height information of a second position in which the access node is located; and
determining the first height information of the first position in which the user equipment is located comprises determining, by the user equipment, that the second height information of the second position in which the access node is located is the first height information of the first position in which the user equipment is located.

11. The method according to claim 9, wherein:
the broadcast message further comprises a second height information of a second position in which the access node is located; and
selecting in response to receiving a plurality of broadcast messages from a plurality of access nodes, according to a plurality of receive power values corresponding to the plurality of access nodes, height information corresponding to a selected access node of the plurality of access nodes, with a maximum receive power value, as the first height information of the first position in which the user equipment is located.

12. The method according to claim 9, wherein determining the first height information of the first position in which the user equipment is located further comprises:
sending second height information to a base station, wherein the second height information comprises the node identifier of the access node and the receive power information of the user equipment; and
receiving a response message returned by the base station, wherein the response message comprises the first height information of the first position in which the user equipment is located.

13. A method comprising:
receiving, by an access node, a first height information requirement message delivered by a network side device, wherein the first height information requirement message requests a first height information of a first position in which the access node is located;
obtaining, by the access node, the first height information of the first position in which the access node is located; and sending, in response to receiving the first height information requirement message, by the access node, a first response message to the network side device, wherein the first response message comprises the first height information of the first position in which the access node is located.

14. The method according to claim 13, wherein the first height information obtained by the access node of the first position in which the access node is located comprises a height measurement, obtained by the access node by a measurement of the first position in which the access node is located.

15. The method according to claim 13, wherein obtaining, by the access node, the first height information of the first position in which the access node is located further comprises:
sending, by the access node, a second height information requirement message to a user equipment, wherein the user equipment is located in a signal coverage area of the access node, and the second height information requirement message requests a second height information of a second position in which the user equipment is located;
receiving a second response message reported by the user equipment, wherein the second response message comprises the second height information of the second position in which the user equipment is located; and
using the second height information of the second position in which the user equipment is located as the first height information of the first position in which the access node is located.

16. A user equipment comprising:
a receiving unit configured to receive a height requirement message sent by a network side device, wherein the height requirement message causes the user equipment to obtain a height of a first position in which the user equipment is located;
a listening unit configured to listen to a broadcast message sent by an access node, wherein the broadcast message comprises a node identifier of the access node and is received with a receive power by the user equipment; and
a sending unit configured to send, in response to receiving the height requirement message, a response message to the network side device, wherein the response message comprises the node identifier of the access node and receive power information comprising the receive power of the user equipment causing the network side device to determine the height of the first position in which the user equipment is located according to the node identifier of the access node and the receive power information of the user equipment.

17. The user equipment according to claim 16, wherein:
the broadcast message comprises a second height information of a second position in which the access node is located;
the user equipment comprises a processing unit configured to use the second height information of the second position in which the access node is located as a first height information of the first position in which the user equipment is located; and
the response message sent by the sending unit to the network side device further comprises the first height information of the first position in which the user equipment is located.

18. The user equipment according to claim 16, wherein:
the broadcast message further comprises a second height information of a second position in which the access node is located; and
the user equipment further comprises a selection unit configured to select, in response to receiving a plurality of broadcast messages from a plurality of access nodes, according to a plurality of receive power values corresponding to the plurality of access nodes, height information corresponding to a selected access node of the plurality of access nodes, with a maximum receive power value, as a first height information of the first position in which the user equipment is located.

19. The user equipment according to claim 16, wherein:
the user equipment has a height measurement module configured to measure a first height information of the first position in which the user equipment is located; and
the response message sent by the sending unit to the network side device further comprises the first height information of the first position in which the user equipment is located.

20. A network side device comprising:
a sending unit configured to send a height requirement message to user equipment, wherein the height requirement message requests height information of a position in which the user equipment is located;
a receiving unit configured to receive, in response to sending the height requirement message, a response message sent by the user equipment, wherein the response message comprises a node identifier of an access node and receive power information of the user equipment; and
a processing unit configured to determine, according to the node identifier of the access node and the receive power information of the user equipment, the height information of the position in which the user equipment is located.

21. A user equipment comprising:
a receiving unit configured to receive a broadcast message from an access node, wherein the broadcast message comprises a node identifier of the access node and is received with a receive power by the user equipment; and
a processing unit configured to determine, according to the broadcast message, a first height information of a first position in which the user equipment is located according to the node identifier of the access node and a receive power information of the user equipment comprising the receive power.

22. The user equipment according to claim 21, wherein:
the broadcast message further comprises a second height information of a second position in which the access node is located; and
the processing unit uses the second height information of the second position in which the access node is located as the first height information of the first position in which the user equipment is located.

23. The user equipment according to claim 21, wherein:
the broadcast message further comprises a second height information of a second position in which the access node is located; and
the user equipment further comprises a selection unit configured to select, in response to receiving a plurality of broadcast messages from a plurality of access nodes, according to a plurality of receive power values corresponding to the plurality of access nodes, height information corresponding to a selected access node of the plurality of access nodes, with a maximum receive power value, as the first height information of the first position in which the user equipment is located.

24. The user equipment according to claim 21, wherein:
the processing unit further comprises a sending unit configured to send second height information to a base station, wherein the second height information comprises the node identifier of the access node and the receive power information of the access node received by the user equipment; and
the receiving unit is further configured to receive a response message returned by the base station, wherein the response message comprises the first height information of the first position in which the user equipment is located.

25. An access node comprising:
a receiving unit configured to receive a height information requirement message delivered by a network side device, wherein the height information requirement message requests a height information of a position in which the access node is located;
an obtaining unit configured to obtain the height information of the position in which the access node is located; and
a sending unit configured to send, in response to receiving the height information requirement message, a response message to the network side device, wherein the response message comprises the height information of the position in which the access node is located.

* * * * *